(12) United States Patent
Kobayashi et al.

(10) Patent No.: US 6,415,351 B1
(45) Date of Patent: Jul. 2, 2002

(54) SWITCHING ACCESS TO A FLASH MEMORY FROM AN IC CARD, AFTER DOWNLOADING IS COMPLETE, WHILE THE POWER IS STILL ON

(75) Inventors: Kazunori Kobayashi; Masaki Tsurui, both of Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/398,821

(22) Filed: Sep. 20, 1999

(30) Foreign Application Priority Data

| Sep. 22, 1998 | (JP) | 10-268495 |
| Nov. 26, 1998 | (JP) | 10-335387 |
| Sep. 10, 1999 | (JP) | 11-257776 |

(51) Int. Cl.$^7$ ............................................. G06F 12/02
(52) U.S. Cl. ...................................... 711/103; 711/115
(58) Field of Search ................................ 711/115, 103, 711/211; 714/42–44, 47–49; 713/1, 100

(56) References Cited

U.S. PATENT DOCUMENTS 5,487,161 A * 1/1996 Koenck et al. ............. 711/115
5,819,307 A * 10/1998 Iwamoto et al. ............. 711/103

FOREIGN PATENT DOCUMENTS

| JP | 8-77040 | 3/1996 |
| JP | 10-145571 | 5/1998 |

* cited by examiner

Primary Examiner—Matthew Kim
Assistant Examiner—Denise Tran
(74) Attorney, Agent, or Firm—Oblon, Spivak, McClelland, Maier & Neustadt, P.C.

(57) ABSTRACT

An electronic apparatus in which program switching can be easily carried out between an IC card and a flash ROM is provided. The IC card can be used commonly for downloading and option programs. In this electronic apparatus, a first program is stored in the flash ROM, while a second program is stored in the IC card. The IC card is detachably connected by an IC card connector. The CPU carries out either the first program or the second program in accordance with memory maps having the addresses of the flash ROM and the IC card logically arranged. By interchanging the addresses of the flash ROM and the IC card, either the first program and the second program is selected and supplied to the CPU.

12 Claims, 25 Drawing Sheets

SETTING SW ON & IC CARD CONNECTED

SETTING SW OFF & IC CARD CONNECTED

SETTING SW ON & IC CARD UNCONNECTED

SETTING SW OFF & IC CARD UNCONNECTED

THE IC CARD UNCONNECTED DESPITE THE BOOT FROM THE IC CARD

THE BOOT FROM THE FLASH ROM

THE BOOT FROM THE IC CARD & THE IC CARD CONNECTED

THE IC CARD UNCONNECTED DESPITE THE BOOT FROM THE IC CARD

THE BOOT FROM THE FLASH ROM

THE BOOT FROM THE IC CARD & THE IC CARD CONNECTED

SWITCHING ACCESS TO A FLASH MEMORY FROM AN IC CARD, AFTER DOWNLOADING IS COMPLETE, WHILE THE POWER IS STILL ON

BACKGROUND OF THE INVENTION

1. Field of the Invention

The present invention relates to an electronic apparatus, and, more particularly, to an electronic apparatus, such as an image forming apparatus, which operates in accordance with a control program stored in a memory, and has a function to download a program from a detachable memory medium such as an IC card.

2. Description of the Related Art

The operation of a conventional image forming apparatus, such as a digital copying machine or laser printer, is controlled by programs. Such an image forming apparatus is provided with a ROM storing the programs, and the operation of each component is controlled by carrying out each corresponding program.

However, if a change is to be made to the control programs due to known trouble such as bugs, the ROM that stores the programs has to be replaced. To replace the ROM, the apparatus itself has to be disassembled to the point where the ROM can be taken out of the apparatus. Especially after the completion of the apparatus, the replacing the ROM is too troublesome and time-consuming.

In order to shorten the time required for ROM replacing, a flash ROM provided with a program is employed. When a change has to be made to the program, a new program is supplied from an external apparatus, such as a host computer, and is written in the flash ROM. Japanese Laid-Open Patent Application No. 8-77040 discloses a rewrite control method for flash memory. According to this method, when the program data in the flash ROM is rewritten by computer communication, the condition of the image forming apparatus is checked. If the image forming apparatus is in a suitable condition for download, the download is carried out, and the image forming apparatus is prevented from overrunning.

In another recent method, an external memory device, such as an IC card, is connected to the image forming apparatus, and a program is downloaded from the IC card into the flash ROM to update or rewrite the program. By this method, the program updating time can be dramatically shortened. In such a case, by connecting the IC card to the apparatus, the addresses of the flash ROM and the IC card are interchanged on memory maps. By doing so, the apparatus is started based on the program stored in the IC card, and the program is downloaded into the flash ROM.

To download the program, Japanese Laid-Open Patent Application No. 10-145571 discloses techniques of preventing wrong program writing and preventing data stored in a non-volatile memory from being destroyed when a program from the IC card is written in the flash ROM. The data stored in the non-volatile memory should be saved even after the power source of the apparatus is switched off, containing data on operation conditions of the apparatus. If the apparatus is a copying machine on lease, for instance, information concerning a lease charge, such as information on the number of copies made, is stored in the non-volatile memory.

The IC card in the image forming apparatus may be utilized for option programs, for instance, a program of adding a data table to the main program stored in the flash ROM. In such a case, functions other than the standard functions can be added by connecting the IC card to start the apparatus.

In the image forming apparatus having the above structure, even if the download of a desired program is already complete, the main device operates by the program stored in the IC card while the power switch is on.

Generally, a connector for the IC card is disposed in a place where the IC card can be easily inserted and pulled out. If the IC card is inadvertently or accidentally pulled out while the power switch is on, the program in operation in the main device might be stopped. In such a case, the main device is malfunctioned, or some components of the main device might be damaged due to the malfunction.

Furthermore, since the IC card is mainly used for download, the addresses of the flash ROM and the IC card are interchanged on memory maps by connecting the IC card to the main device, and the main device is then started by the program from the IC card. In a case where the IC card is used for option programs, the main device is started by the program from the IC card after the connection of the IC card is detected. In such a case, the main device cannot operate in accordance with the program stored in the flash ROM, because the program stored in the IC card is already selected. In other words, the IC card cannot be used for option programs. Therefore, when the IC card is used for option programs, a special operation needs to be performed so as to start the main device by the program from the flash ROM. Such a special operation only causes trouble for users.

In the image forming apparatus, user data, such as preset values of the apparatus and user information, is stored in the non-volatile memory. When the apparatus or the main control board is replaced with a new one, the non-volatile memory is mounted on the new one, carrying information from the replaced one. Thus, operations such as resetting can be made unnecessary. However, there is a problem that, when the main device is started by the program from the IC card to download the program, the user data stored in the non-volatile memory might be rewritten due to malfunction, such as program overrunning caused by imperfect connection of the IC card.

SUMMARY OF THE INVENTION

It is a general object of the present invention to provide an improved and useful electronic apparatus in which the above-mentioned problems are eliminated.

A more specific object of the present invention is to provide an electronic apparatus in which program reading can be easily switched between a memory medium such as a detachable IC card and a rewritable memory such as a flash ROM.

Another object of the present invention is to provide an electronic apparatus in which program overrun can be prevented even if the IC card slipped off the apparatus after download.

Still another object of the present invention is to provide an electronic apparatus in which the IC card can be used for downloading and option programs.

Yet another object of the present invention is to provide an electronic apparatus in which data stored in a non-volatile memory of the main device can be prevented from being rewritten or erased even if the IC card slips off the apparatus while a program is being downloaded from the IC card.

To achieve the above objects, the present invention provides an electronic apparatus including:

a memory which stores a first program;

a connector for connecting a memory medium which stores a second program;

a processor which controls an operation of the electronic apparatus by carrying out either the first program or the second program in accordance with memory maps having at least addresses of the memory and the memory medium logically arranged; and an interchanging circuit which interchanges the addresses of the memory and the memory medium in accordance with the memory maps so that either the first program or the second program is selectively read out and is supplied to the processor.

With this structure, even if the IC card slips off the apparatus when a program is downloaded using the IC card, the main device can continue a normal operation by interchanging the addresses of the IC card and the processor on the memory maps after the download so as to switch the operation to a program operation of the memory of the main device.

The electronic apparatus of the present invention may further comprise: a detector which detects whether the memory medium is connected to the connector; and a switch for issuing an instruction to download the second program. If connection of the memory medium is detected and the switch is in a predetermined position when the power source of the electronic apparatus is turned on, the interchanging circuit interchanges the addresses of the memory and the memory medium in accordance with the memory maps.

With this structure, the program to be read at the time of power supply can be switched between the first program and the second program, so that the memory medium can be used for download or option programs, whichever the user wishes to use.

The electronic apparatus of the present invention may further comprise an error message output circuit which outputs an error message in a case where disconnection of the memory medium is detected and the switch is in the predetermined position when the power source of the electronic apparatus is turned on.

With this structure, in the case where power is supplied when the memory medium is unconnected and the switch is pushed, the user is notified of the malfunction and is advised to connect the memory medium properly.

The electronic apparatus of the present invention may further comprises: a non-volatile memory which stores data to be saved while the power source of the electronic apparatus is off; and a first access disable circuit which prohibits access to the non-volatile memory in a case where disconnection of the memory medium is detected and the switch is in the predetermined position when the power source of the electronic apparatus is turned on.

With this structure, if the download operation is performed when the IC card is unconnected, unprepared access to the non-volatile memory can be prevented, thereby protecting data stored in the non-volatile memory.

The electronic apparatus of the present invention further comprises a second access disable circuit which prohibits access to the non-volatile memory in a case where the detector detects disconnection of the memory medium after the second program is read from the memory medium.

With this structure, if the memory medium slips off the apparatus or has improper connection after the second program is booted from the memory medium, the second access disable circuit prohibits read and write access to the non-volatile memory. Thus, the data stored in the non-volatile memory can be prevented from being destroyed.

The electronic apparatus of the present invention may further comprises a write disable circuit which prohibits write in the non-volatile memory in a case where the detector detects disconnection of the memory medium after the second program is read from the memory medium.

With this structure, if the memory medium slips off the apparatus or has improper connection after the second program is booted from the memory medium, the write disable circuit prohibits write access to the non-volatile memory. Thus, the data stored in the non-volatile memory can be used for download, and can be prevented from being destroyed.

Other objects and further features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
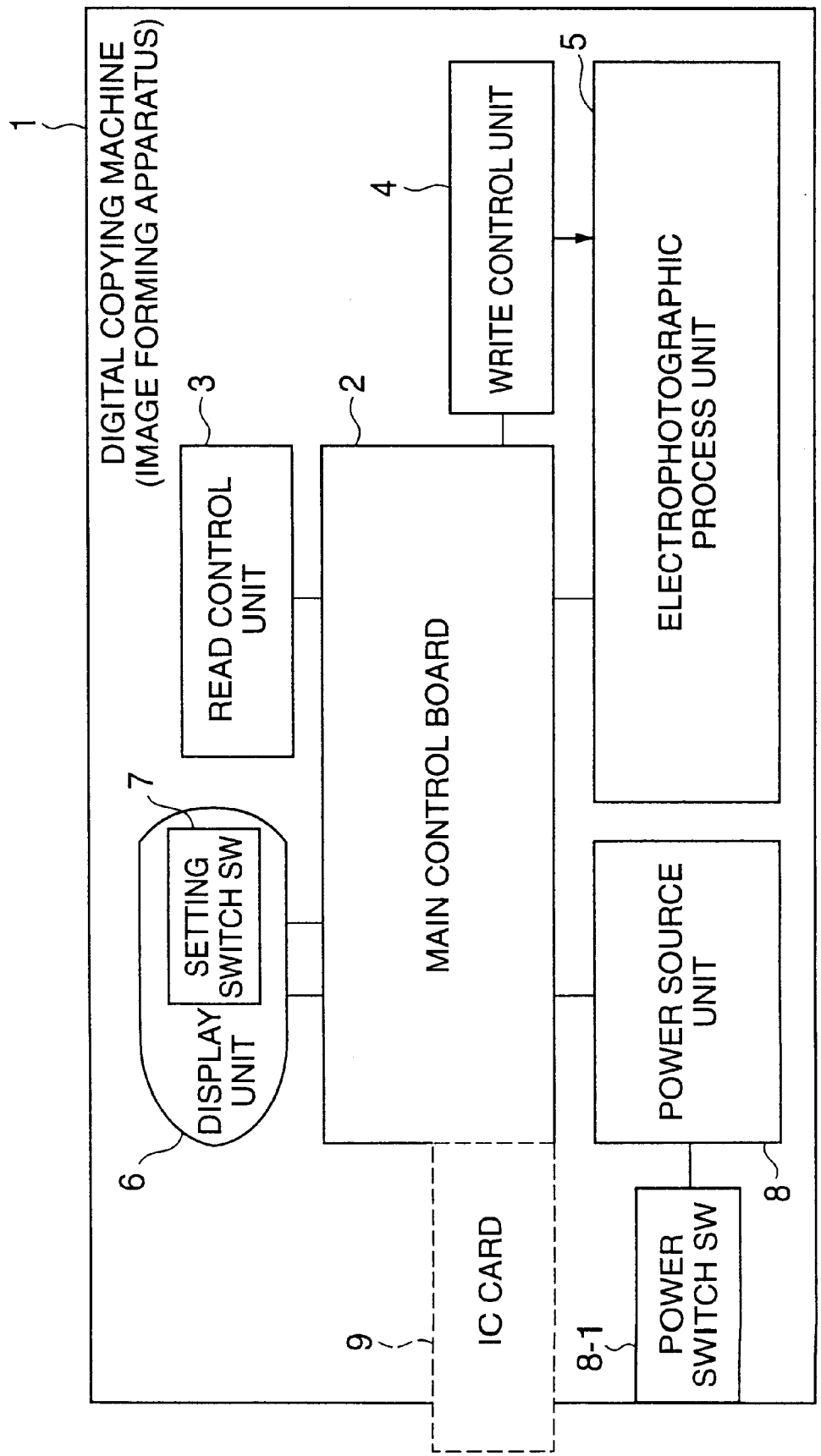
FIG. 1 is a block diagram of the structure of a digital copying machine in accordance with a first embodiment of the present invention.

FIG. 1 is a block diagram of a digital copying machine as an image forming apparatus of a first embodiment of the present invention. In this block diagram, a digital copying machine (an image forming apparatus) 1 comprises a main control board 2, a read control unit 3, a write control unit 4, an electrophotographic process unit 5, a display unit 6, a setting switch (SW) 7, and a power source unit 8. A power switch (SW) 8-1 is connected to the power source unit 8. An IC card 9 is connected to the main control board 2. An image signal read by the read control unit 3 of the digital copying machine 1 sent to the write control unit 4 via the main control board 2. The write control unit 4 controls the electrophotographic process unit 5 in accordance with the supplied image signal. The electrophotographic process unit 5 performs an image forming process such as electrostatic latent image formation. A series of electrophotographic processes are then carried out to form an image on a recording paper sheet.

Figure 2:
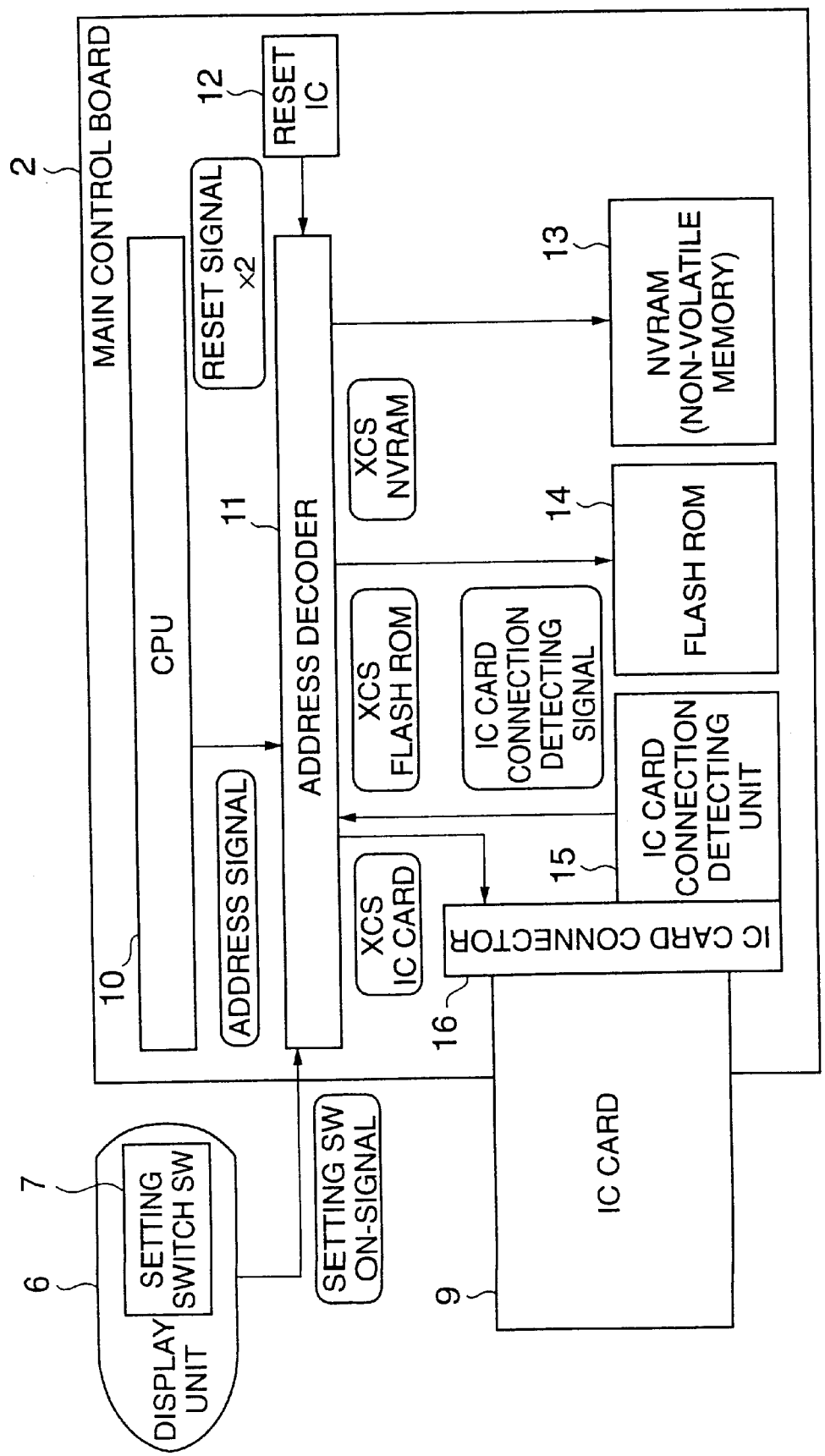
FIG. 2 is a block diagram of a main control board of the digital copying machine of the first embodiment.

FIG. 2 is a block diagram of the main control board of the digital copying machine of the first-embodiment of the present invention. In FIG. 2, the same components as in FIG. 1 are indicated by the same reference numerals. The main control board 2 comprises a CPU 10, an address decider 11, a reset IC 12, a non-volatile memory (NVRAM) 13, a flash ROM 14, an IC card connection detecting unit 15 and an IC card connector 16. The display unit 6 including the setting switch 7 is connected to the address decoder 11. The IC card 9 is detachably connected to the IC card connector 16.

Figure 3:
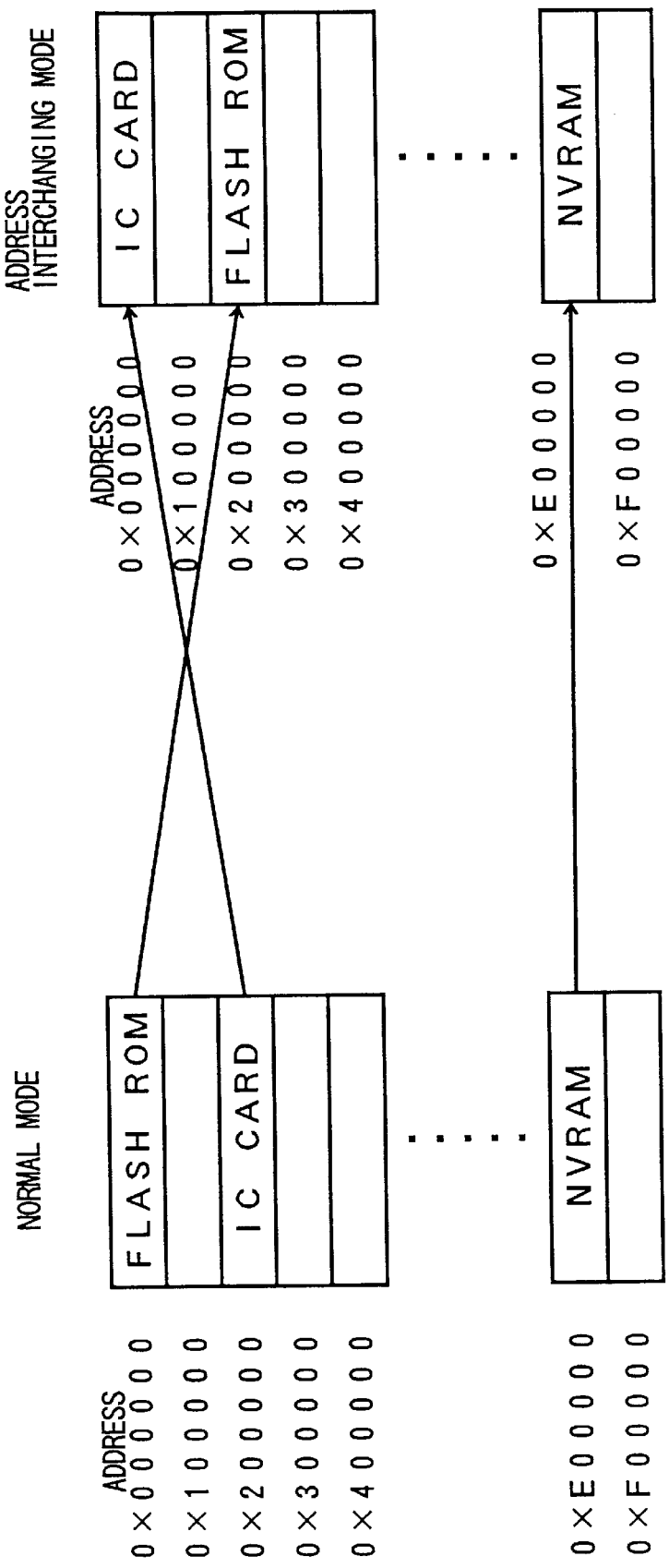
FIG. 3A is a memory map of a normal mode in the first embodiment.
FIG. 3B is a memory map of an address interchanging mode in the first embodiment.
Figure 4:
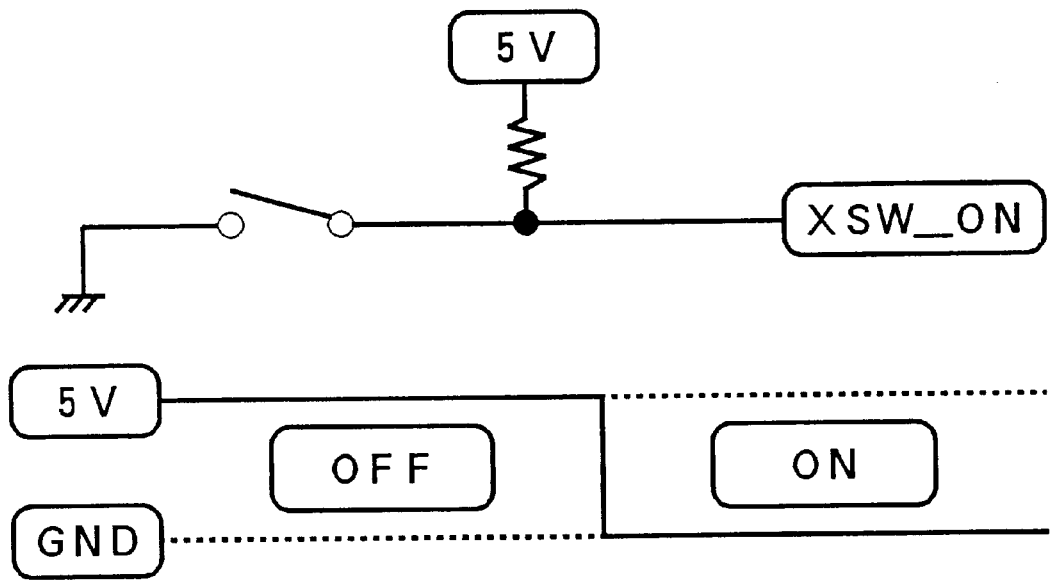
FIG. 4 illustrates an ON-signal of a setting switch in the first embodiment.
Figure 5:
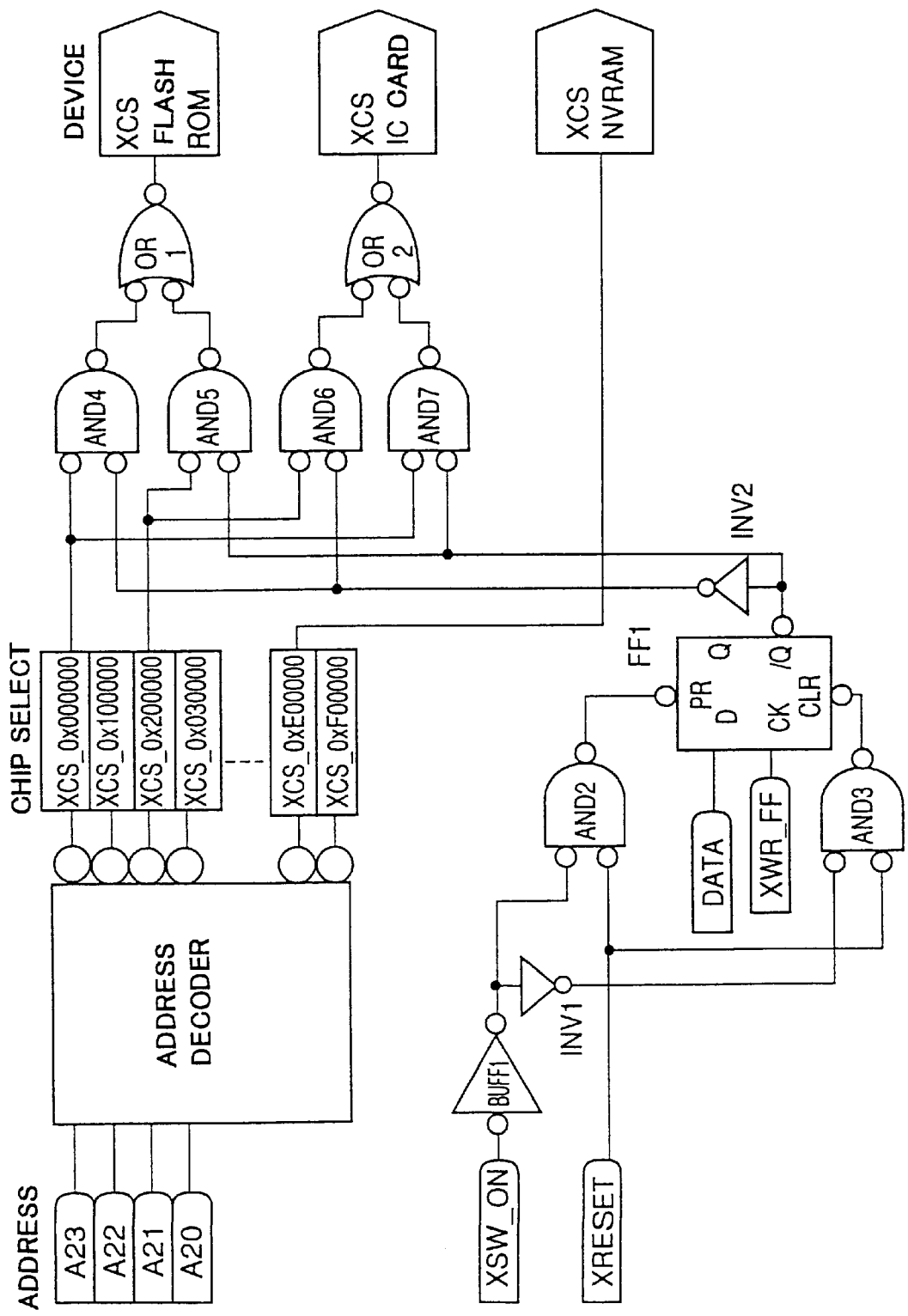
FIG. 5 is a circuit diagram of an address decoder in the first embodiment.
Figure 6:
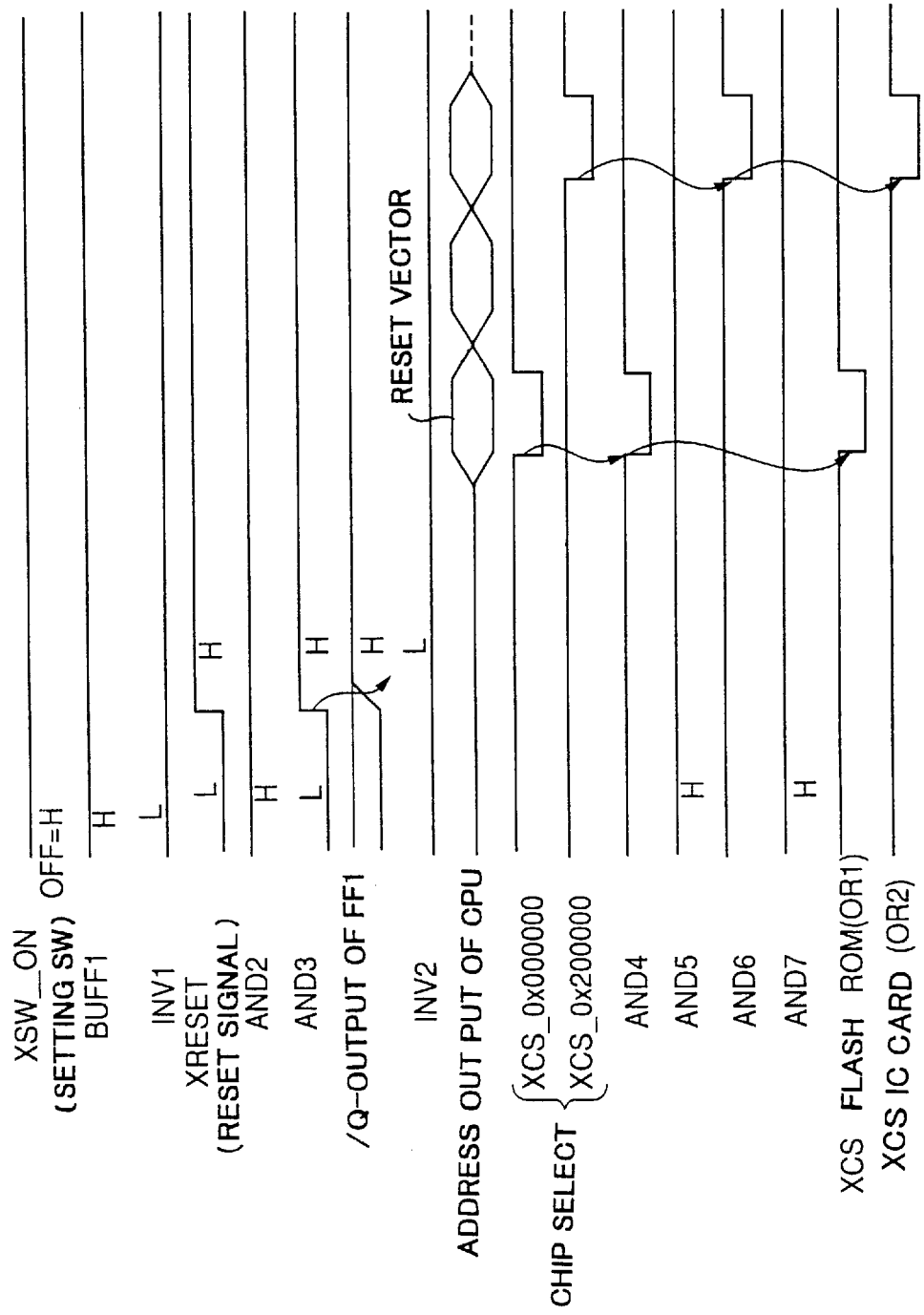
FIG. 6 is a timing chart of signals in the circuit of FIG. 5 in the normal mode.

FIG. 3A shows a memory map when the digital copying machine 1 operates in a normal mode, and FIG. 3B shows a memory map when the digital copying machine 1 operates in an address interchanging mode. FIG. 4 illustrates an ON/OFF signal at the setting switch 7. FIG. 5 is a circuit diagram of the address decoder 11. FIG. 6 is a timing chart of the circuit of FIG. 5.

When the digital copying machine 1 of this embodiment starts operating, the power switch 8-1 shown in FIG. 1 is first turned on, thereby supplying power to the components of the digital copying machine 1 including the main control board 2. A reset signal (XRESET) outputted from the reset IC 12 of the main control board 2 changes from an "L" level indicating that the digital copying machine 1 is in a reset condition to an "H" level indicating that it is not in the reset condition. The CPU 10 then outputs the address of a reset vector. The address outputted from the CPU 10 is decoded by the address decoder 11, and each chip select signal (XCS) for each corresponding device becomes active in accordance with the memory maps of FIGS. 3A and 3B.

The address decoder 11 is a 4-to-16 address decoder as shown in FIG. 5, and in accordance with inputted address signals A23 to A20, each chip select signal is outputted to each corresponding address. The normal mode operation of the circuit shown in FIG. 5 will be described below, with reference to the timing chart of FIG. 6. In the normal mode, the power source is on when the setting switch 7 is OFF (XSW-ON ="H"), so that the output of the buffer (BUFFL) is "H". In the reset condition (XRESET="L"), the output of AND2 is "H", and the output of AND3 is "L". Thus, a flip-flop (FF1) is cleared. Accordingly, the /Q-output of FF1 becomes "H", and when the reset signal (XRESET) changes from "L" to "H", the /Q-output of FF is fixed at "H". The outputs of AND4 and AND6 are varied depending on the output of the address decoder 11.

As described above, in accordance with the memory map of the normal mode shown in FIG. 3A, each chip select signal is outputted to each corresponding device. For instance, if the address of the reset vector is "0x 00000, the chip select signal for the flash ROM becomes active, and a program is read out from the flash ROM. The CPU 10 starts operating based on the program, and the main device is controlled in accordance with a series of control programs.

Figure 7:
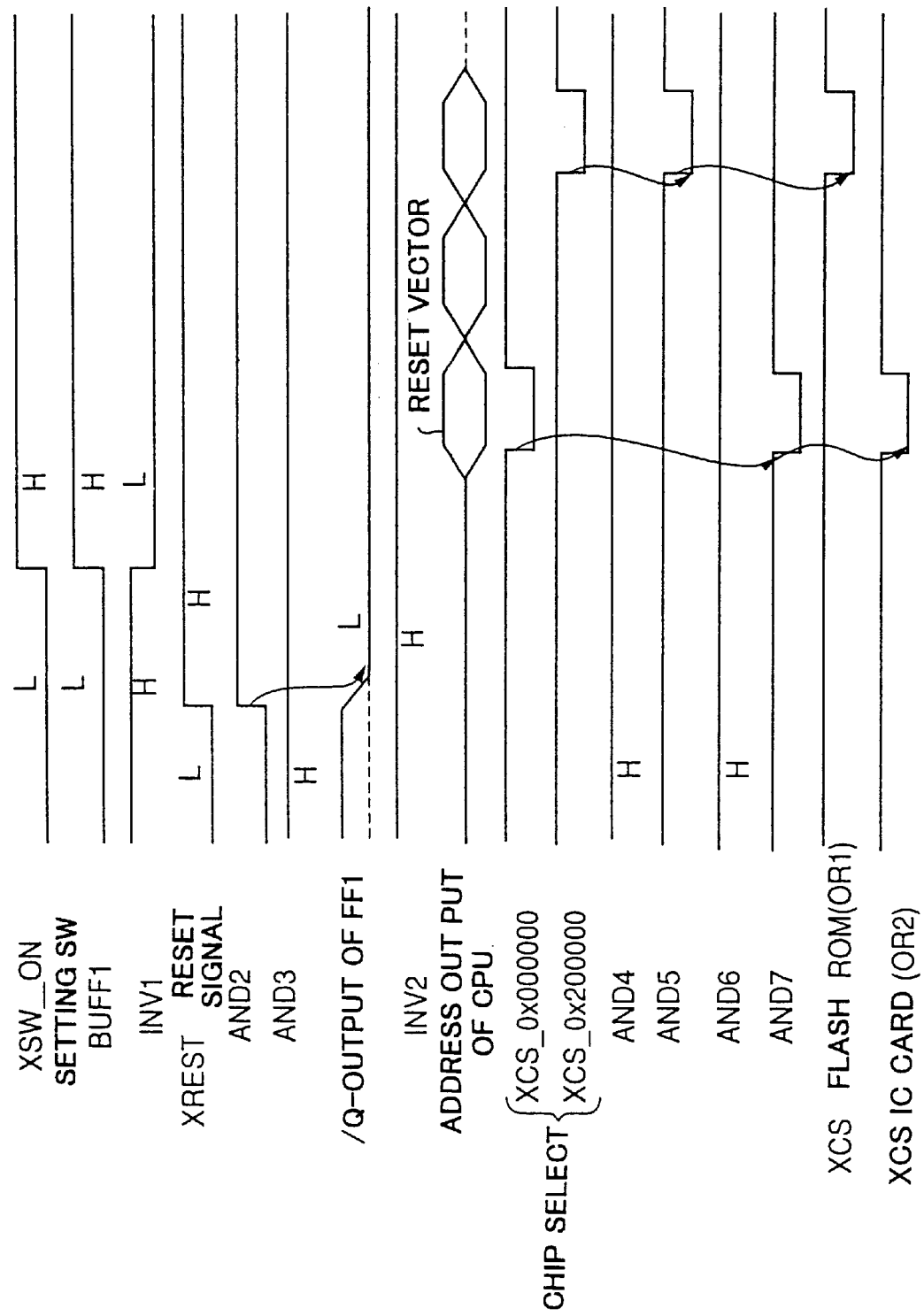
FIG. 7 is a timing chart of signals in the circuit of FIG. 5 in the address interchanging mode.

FIG. 7 is a timing chart of the operation in the address interchanging mode. In the address interchanging mode, the power source is on when the setting switch 7 is on (XSW-ON="L"), and the output of the BUFF1 becomes "L" accordingly. During the reset (XRESET=L"), the output of the AND2 becomes "L", and the output of the AND3 becomes "H", thereby presetting the FF1. Accordingly, the /Q-output of the FF1 becomes "L", and when the reset signal (XRESET) changes from "L" to "H", the /Q-output of the FF1 is fixed at "L".

As the /Q-output of the FF1 becomes "L", the outputs of the AND4 and AND6 become "H". The outputs of the AND5 and AND7 are varied depending on the output of the address decoder 11. Since the outputs from the address decoder 11 via the AND5 and AND7 are interchanged, each chip select signal is outputted to each corresponding device in accordance with the memory map of the address interchanging mode shown in FIG. 3B. As a result, the chip select signals for the flash ROM 14 and the OC card 9 are interchanged.

In the normal mode and the address interchanging mode shown in the timing charts of FIGS. 6 and 7, the /Q-output of the FF1 is fixed at the time of the XRESET changing from "L" to "H", and switching between the normal mode and the address interchanging mode on the memory map during an operation is not shown.

In the first embodiment of this embodiment, however, the /Q-output of the FF1 can be switched by data access (DATA) to the D-input of the FF1, as shown in FIG. 5. By doing so, an operation is started in the address interchanging mode shown in FIG. 7. After the download, access is made to the D-input of the FF1 in accordance with the program. The /Q-output of the FF1 then becomes "H", and the operation is switched to the normal mode, thereby enabling operations in accordance with a series of control programs stored in the flash ROM 14. Accordingly, the program stored in the IC card 9 is not used after the download, so that the IC card 9 can be logically separated.

Figure 8:
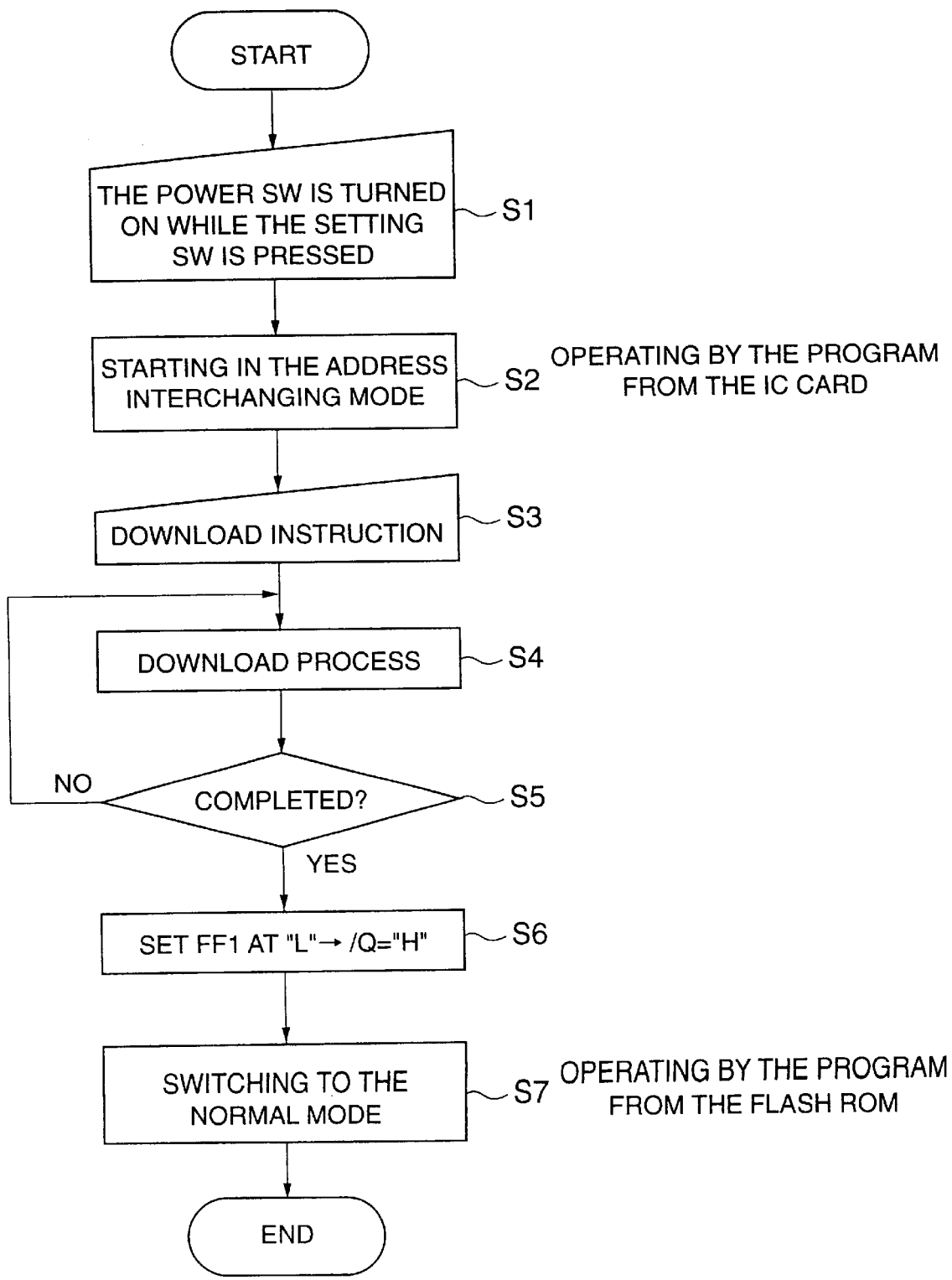
FIG. 8 is a flowchart of an operation of switching from the address interchanging mode to the normal mode.

FIG. 8 is a flowchart of the above operation. First, to download a new program, the power switch 8-1 is turned on while the setting switch 7 of the image forming apparatus 1 is pressed (step 1). The image forming apparatus 1 is started in the address interchanging mode set by the address decoder 11 (step 2). A command to download is issued by a program read from the IC card 9 that is the selected device here (step 3). The download process is then carried out (step 4). Whether the download process is carried out is judged (step 5). If it is judged that-the download process has been completed, "L" is inputted into the D-input of the FF1 shown in FIG. 5, thereby changing the /Q-output to "H" (step 6). By doing so, the device in the normal mode is selected (step 7), and the operation is performed in accordance with a program read from the flash ROM 14.

Figure 9:
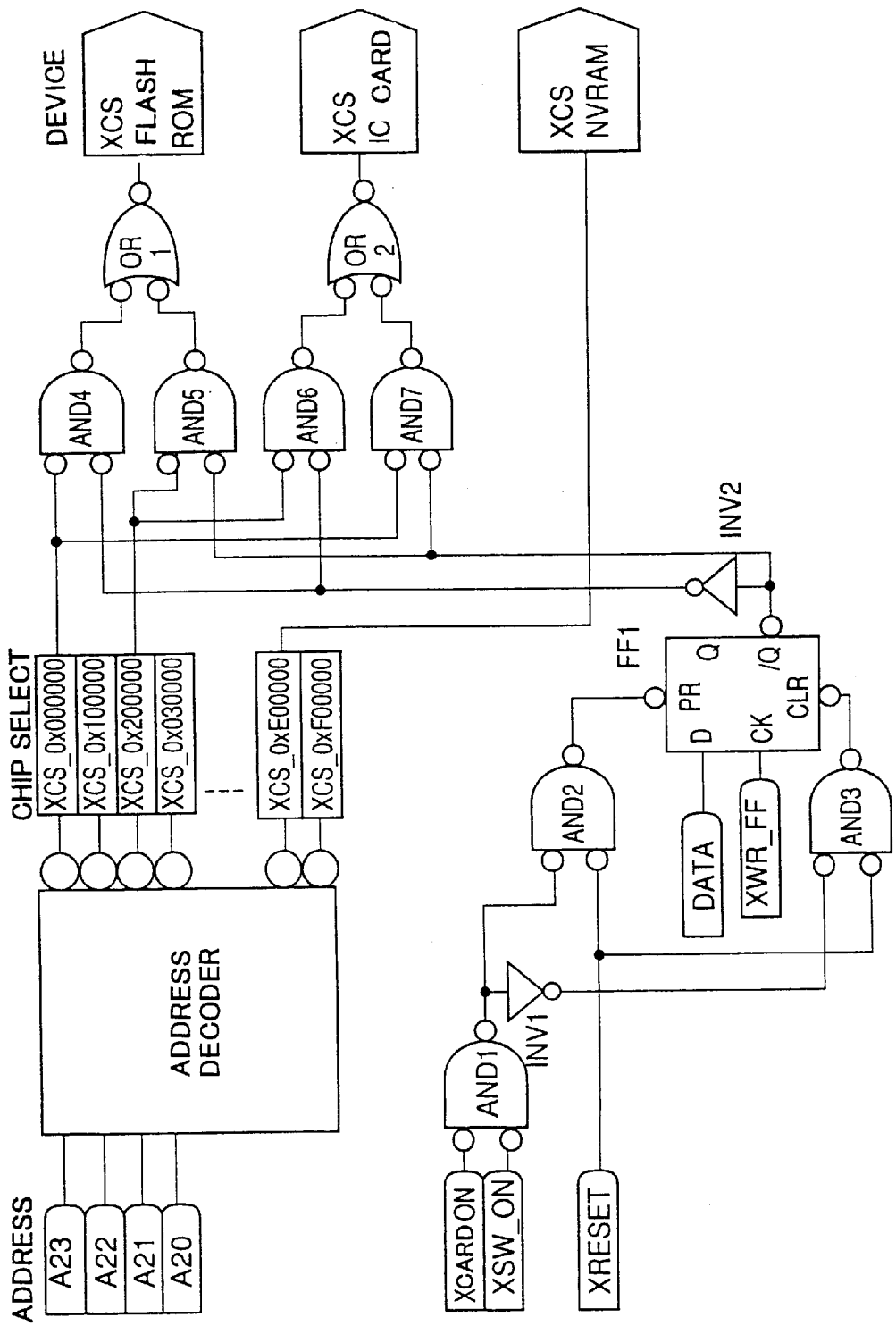
FIG. 9 is a circuit diagram of an address decoder of a second embodiment of the present invention.
Figure 10:
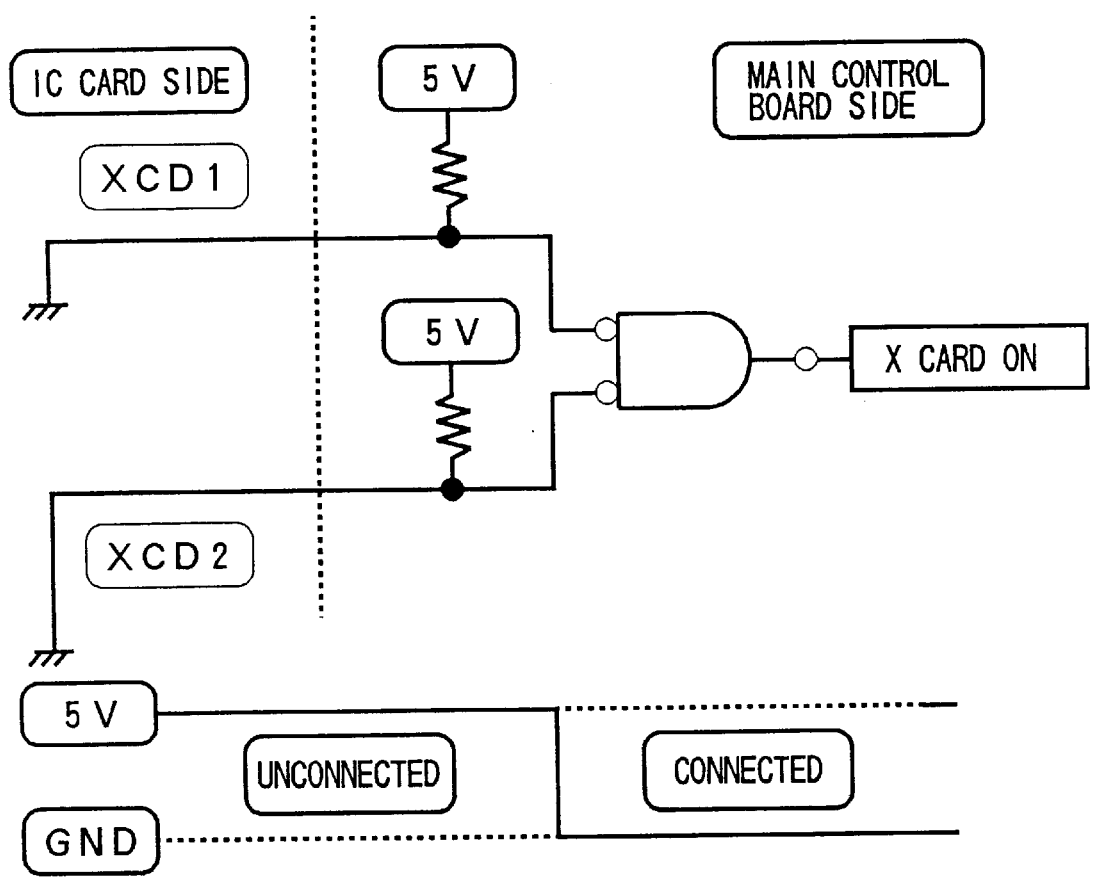
FIG. 10 illustrates a signal for detecting IC cart connection in the second embodiment.

FIG. 9 is a circuit diagram of an address decoder in accordance with a second embodiment of the present invention. FIG. 10 illustrates an IC card connection detection circuit. As shown in FIG. 9, an ON-signal of the setting switch 7 (XSW-ON) and a connection signal of the IC card shown in FIG. 10 (Xcard-ON) are inputted into the AND1 to detect the connection of the IC card. If the power switch 8-1 is turned on while the setting switch 7 is on, the address interchanging mode can be set as shown in Table 1.

TABLE 1

| Xcard-ON input | H | H | L | L |
|---|---|---|---|---|
| XSW-ON input | H | L | H | L |
| FF1/Q output | H | H | H | L |

In Table 1, when the /Q-output of the FF1 is "H", the normal mode is set, and when the /Q-output is "L", the address interchanging mode is set.

Figure 11:
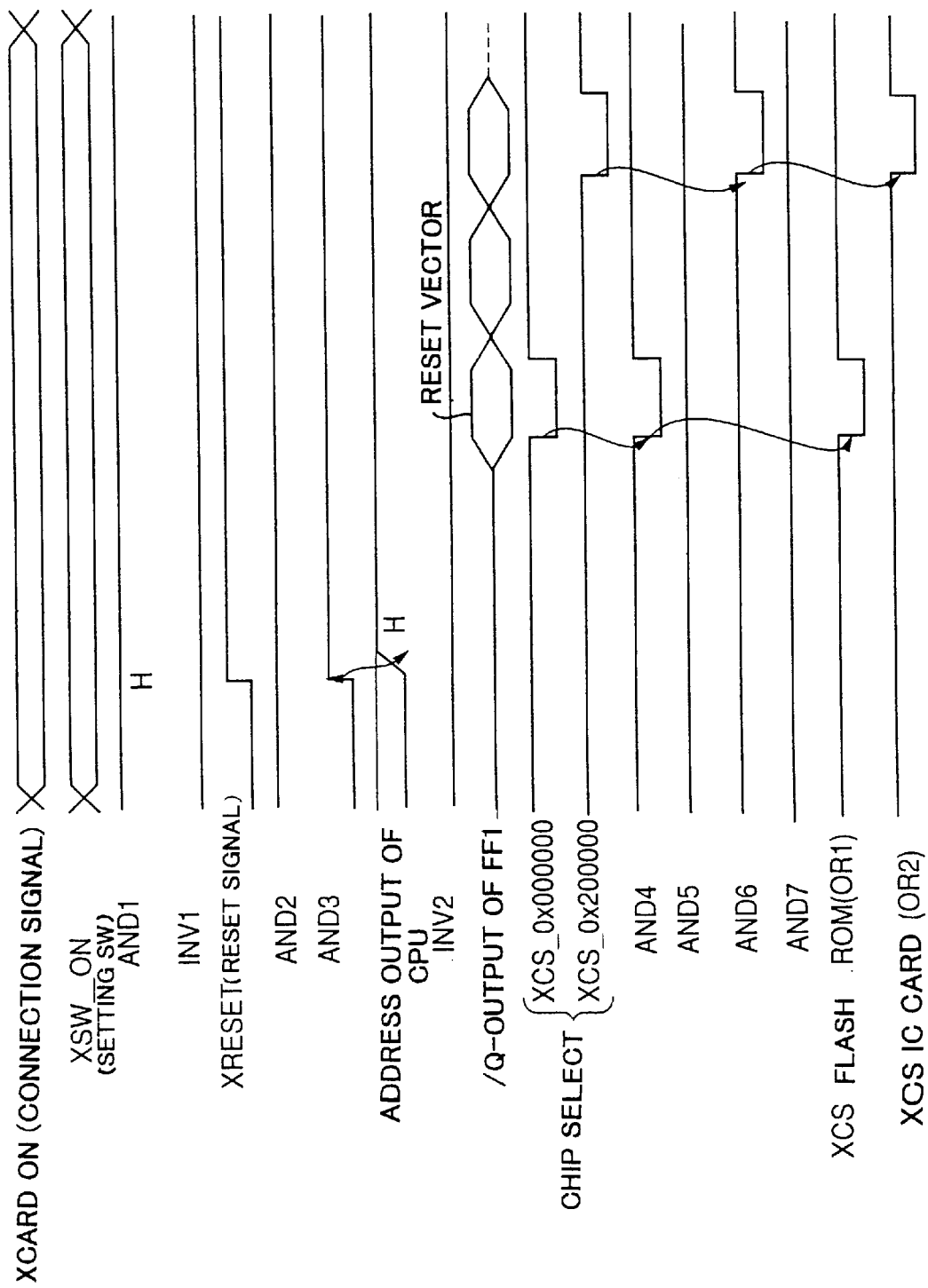
FIG. 11 is a timing chart of signals in the circuit of FIG. 9 in the normal mode.

FIG. 11 is a timing chart of an operation in the normal mode in accordance with the second embodiment. In the normal mode, the power source is on when the IC card is unconnected (Xcard-ON="H") or the setting switch 7 is OFF (XSW-ON="H"). Accordingly, the output of the AND1 becomes "H", and the image forming apparatus 1 is started in the normal mode as shown in FIG. 6. Also, when the Xcard-ON is "H" and the XSW-ON is "L", or when the Xcard-ON is "L" and the XSW-ON is "H", the normal mode is set.

Figure 12:
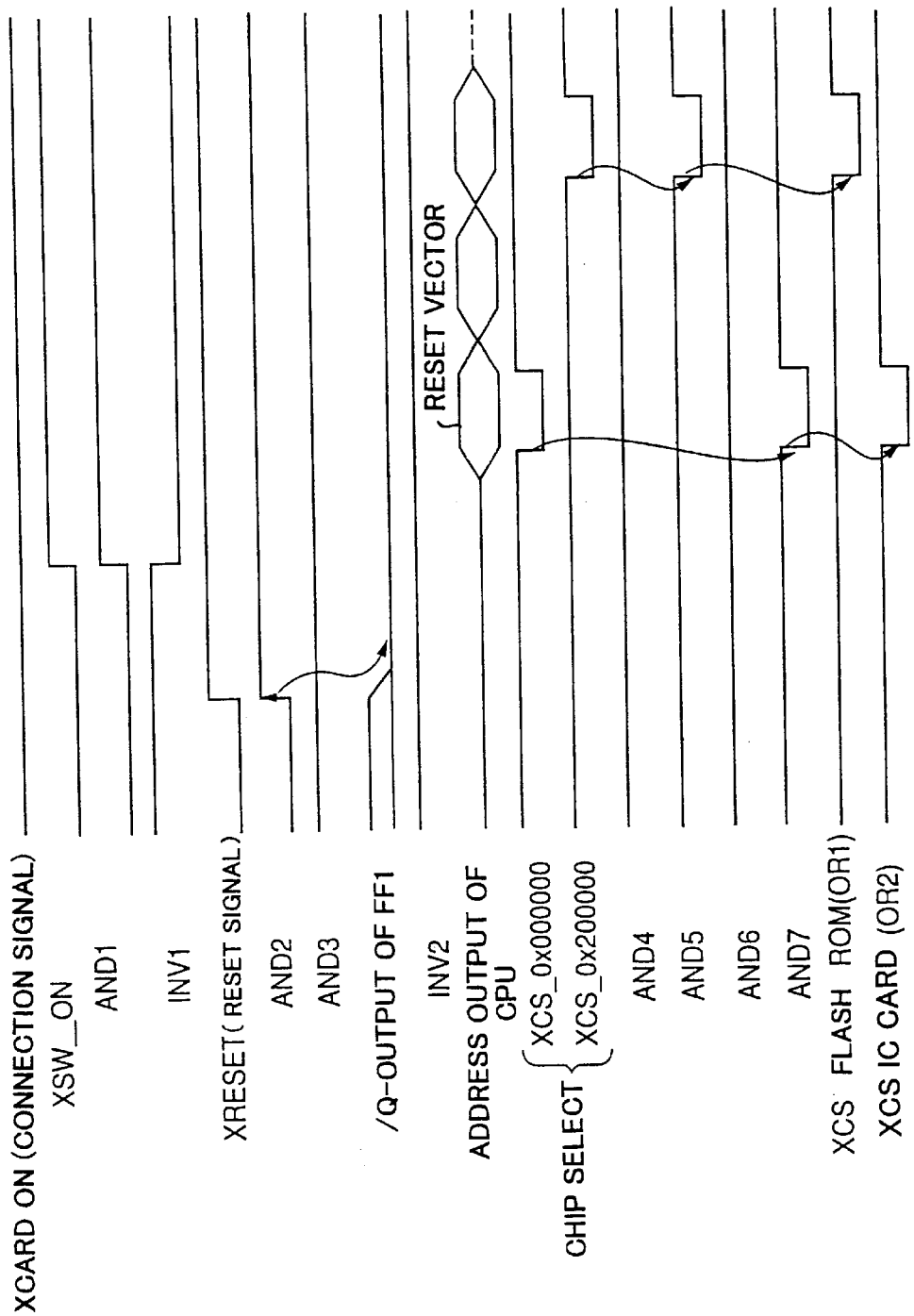
FIG. 12 is a timing chart of signals in the circuit of FIG. 9 in the address interchanging mode.

FIG. 12 is a timing chart of an operation in the address interchanging mode. In the address interchanging mode, the IC card connection is detected (Xcard-ON="L"), and the setting switch 7 is on (XSW-ON="L"). Accordingly, the output of the AND1 becomes "L", and the image forming apparatus 1 is started in the address operation mode as shown in FIG. 7.

As described above, the second embodiment includes the AND1 shown in FIG. 9 instead of the BUFF1 of the first embodiment shown in FIG. 5, and the ON-signal of the setting switch (XSW-ON) and the connection signal of the IC card (Xcard-ON) are added as the input to the AND1. When the operation is switched between the normal mode and the address interchanging mode in the second embodiment, the connection state of the IC card is checked. As for the "normal mode" and the "address interchanging mode", they are the same as in the first embodiment described above.

The connection state of the IC card is detected in the above manner, so that the download process can be carried out in accordance with the program read from the IC card by turning the power switch 8-1 on while the setting switch 7 is on. Also, the power switch 8-1 is turned on while the setting switch 7 is off, so that the image forming apparatus 1 is operated by a program read from the flash ROM, and the IC card can be used for an option program.

Figure 13:
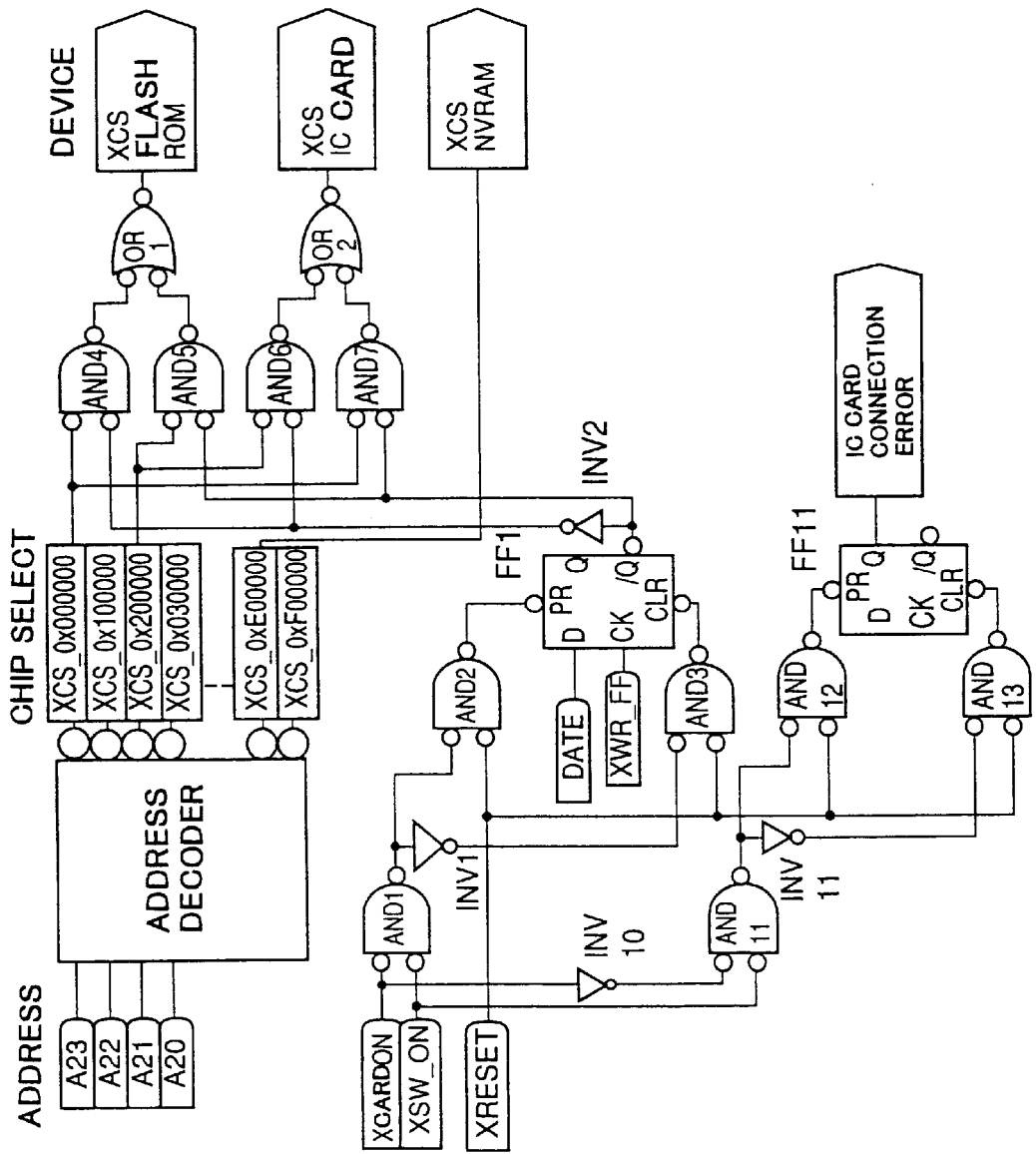
FIG. 13 is a circuit diagram of an address decoder of a third embodiment of the present invention.
Figure 14:
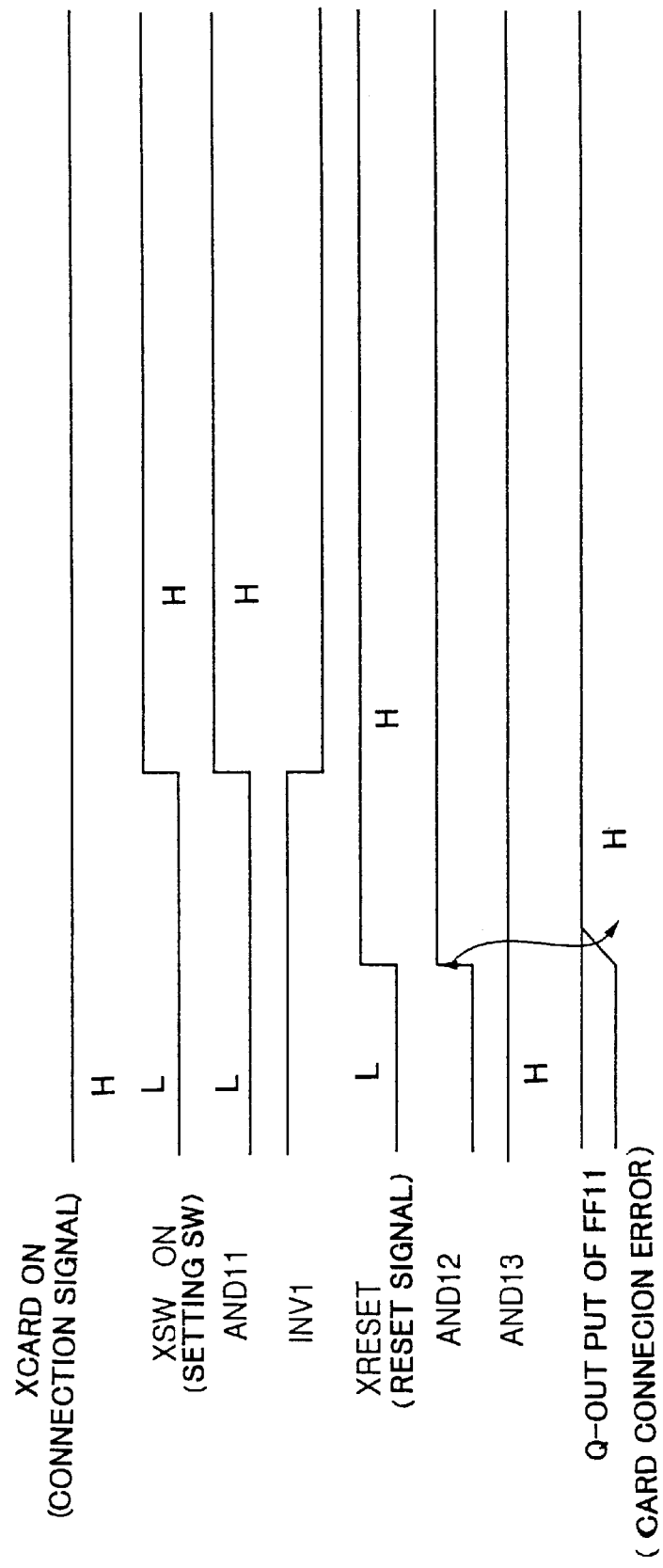
FIG. 14 is a timing chart of signals in the circuit of FIG. 13 when a card connection error occurs.

FIG. 13 is a circuit diagram of an address decoder of a third embodiment of the present invention. The third embodiment is substantially the same as the second embodiment, except that a circuit for outputting an IC card connection error is added to the constitution shown in FIG. 9. FIG. 14 is a timing chart of the operation of outputting the IC card connection error in the third embodiment. The other operations are the same as in the first and second embodiments.

As shown in the timing chart of FIG. 14, In a case where the IC card is in an unconnected state (Xcard-ON="H") when the power source is on while the setting switch 7 is on (XSW-ON="L"), the output of AND11 becomes "L". During the reset process (XRESET="L"), the output of AND12 is "L", and the output of the AND13 is "H", thereby presetting FF11. The Q-output of the FF11 becomes "H", and the /Q-output becomes "L". When the XRESET changes from "L" to "H", the Q-output of the FF11 is fixed. Here, the operation is started in the normal mode as in the timing chart of FIG. 11, and the state of the Q-output of FF11 is checked by a program read out from the flash ROM. When the Q-output of FF11 is "H", an error message as the card connection error is outputted to prompt the user to connect the IC card properly. The relationship between the Xcard-ON and XSW-ON for outputting the error message is shown in Table 2.

TABLE 2

| Xcard-ON input | H | H | L | L |
|---|---|---|---|---|
| XSW-ON input | H | L | H | L |
| FF1/Q output | H | H | H | L |
| FF11 Q output | L | H | L | L |

In this table, when the Q-output of FF11 is "H", the IC car connection is improper.

Figure 15:
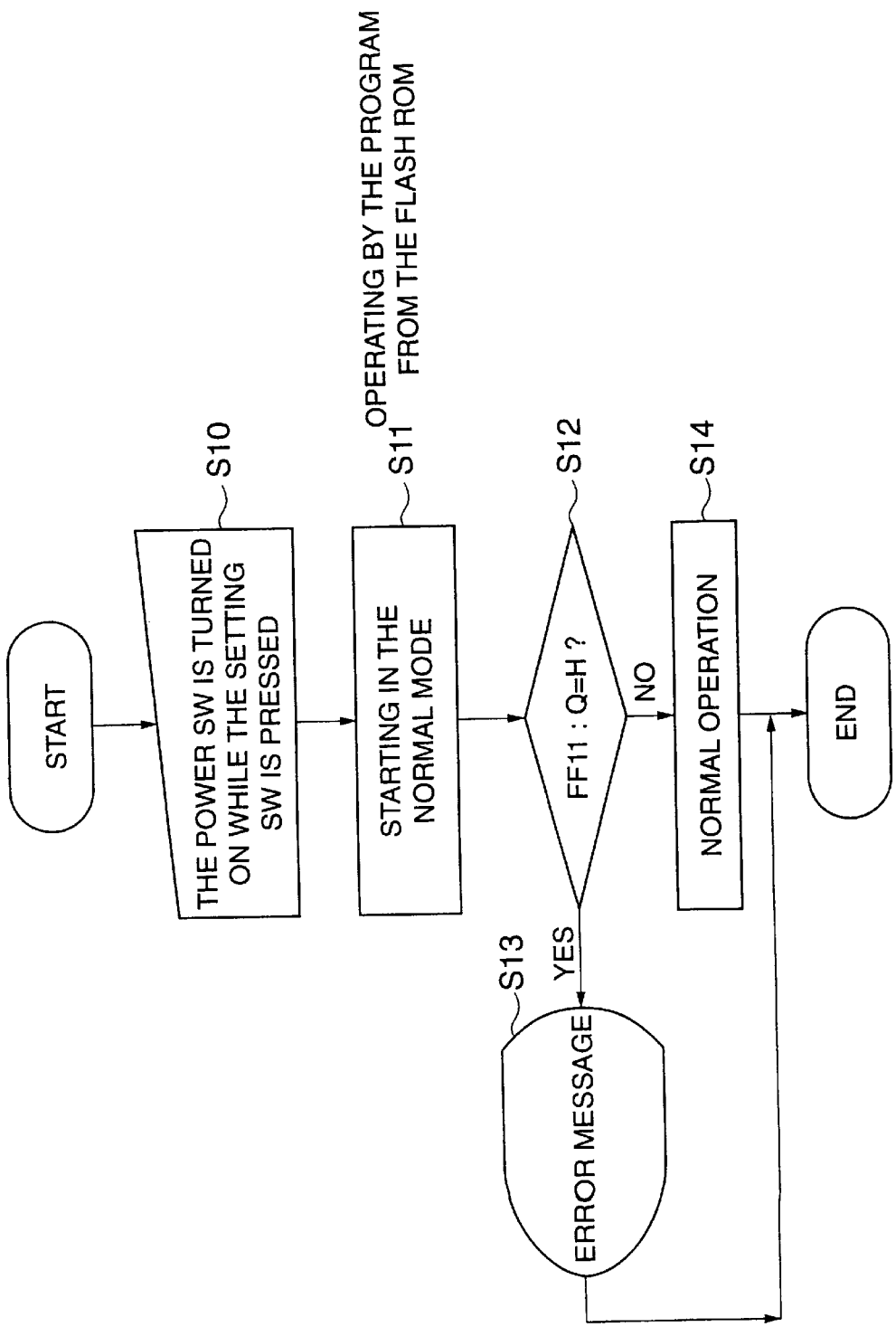
FIG. 15 is a flowchart of an operation when the card connection error occurs in the third embodiment.

FIG. 15 is a flowchart of the above operation. It is assumed here that the user intends to read a program from the IC card at the time of supplying power to the main device. When the IC card is unconnected (Xcard-ON="H"), the user turns the power switch 8-1 on while pressing the setting switch 7 (XSW-ON="L") (step 10). As already mentioned, a program is read out from the IC card, only when the power switch 8-1 is turned on, with the IC card 9 being in a connected state and the setting switch 7 being on. In such a case, the program from the flash ROM is started in the normal mode (step 11). The Q-output of the FF11 is then judged whether to be "H" or "L" in accordance with the started program (step 12). If the Q-output is judged to be "H" in step 12, the unconnected state of the IC card 9 is confirmed. Since the program cannot be read from the IC card 9, the error message is displayed (step 13). If the Q-output is judged to be "L" in step 12, the operation in the normal mode is carried out (step 14).

As described above, in accordance with the third embodiment, in a case where the user tries to download when the IC card is not properly inserted, an error message is displayed to notify the user of the IC card connection error.

Figure 16:
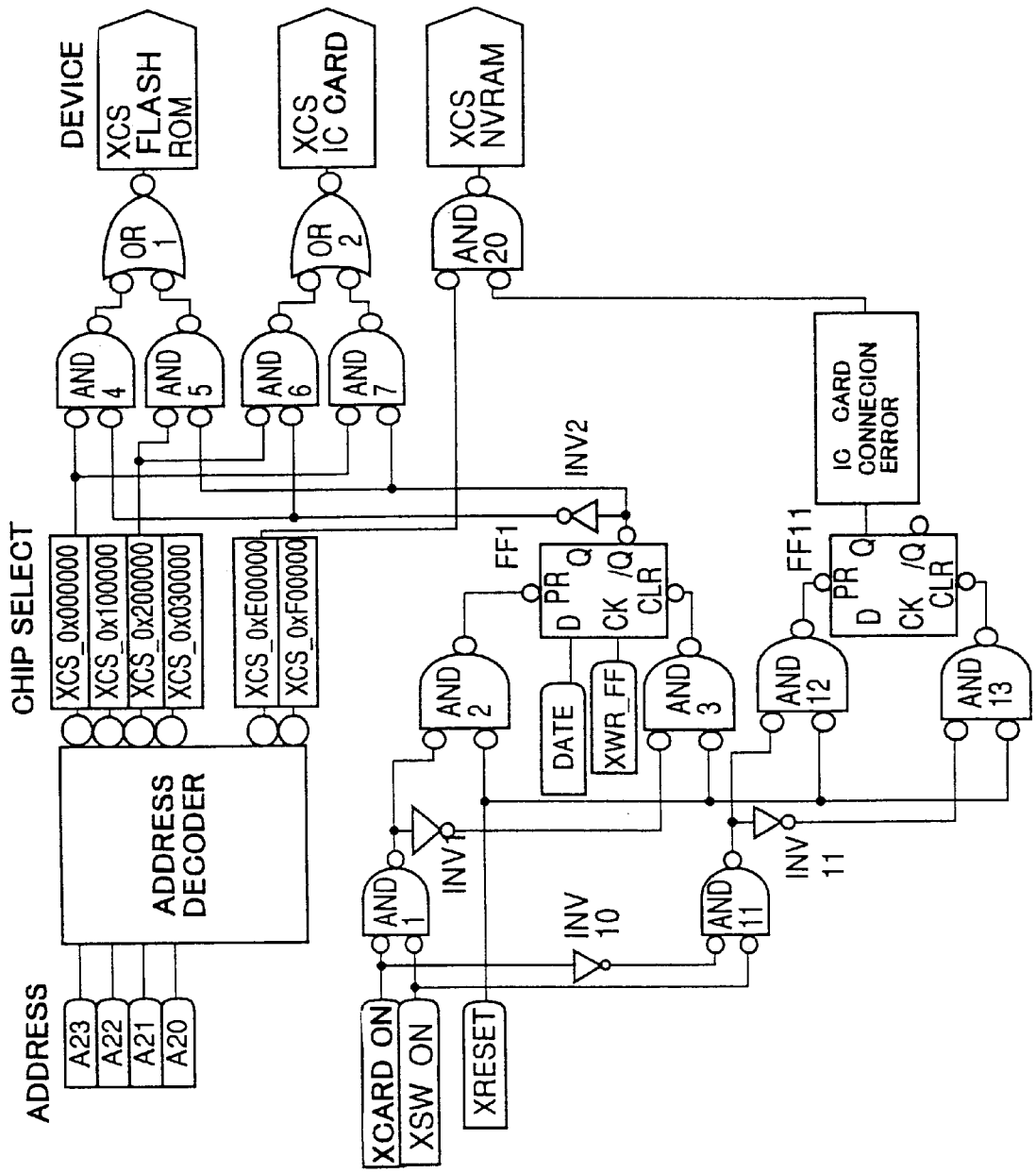
FIG. 16 is a circuit diagram of an address decoder of a fourth embodiment of the present invention.

FIG. 16 is a circuit diagram of an address decoder in accordance with a fourth embodiment of the present invention. In this embodiment, the IC card connection error, which is the Q-output of the FF11 in the third embodiment shown in FIG. 13, is used to control the chip select signal for selecting the NVRAM 13 that stores user data such as apparatus setting information. In a case where the IC card is in an unconnected state when the power source is on while the setting switch is on, the Q-output (IC card connection error) of FF11 becomes "H" as in the third embodiment shown in FIGS. 13 and 14. Here, the output of AND14 is fixed at "H", the chip select signal for the NVRAM 13 is not outputted. Accordingly, access to the NVRAM 13 is prohibited, so that the user data such as setting information can be protected.

Figure 17:
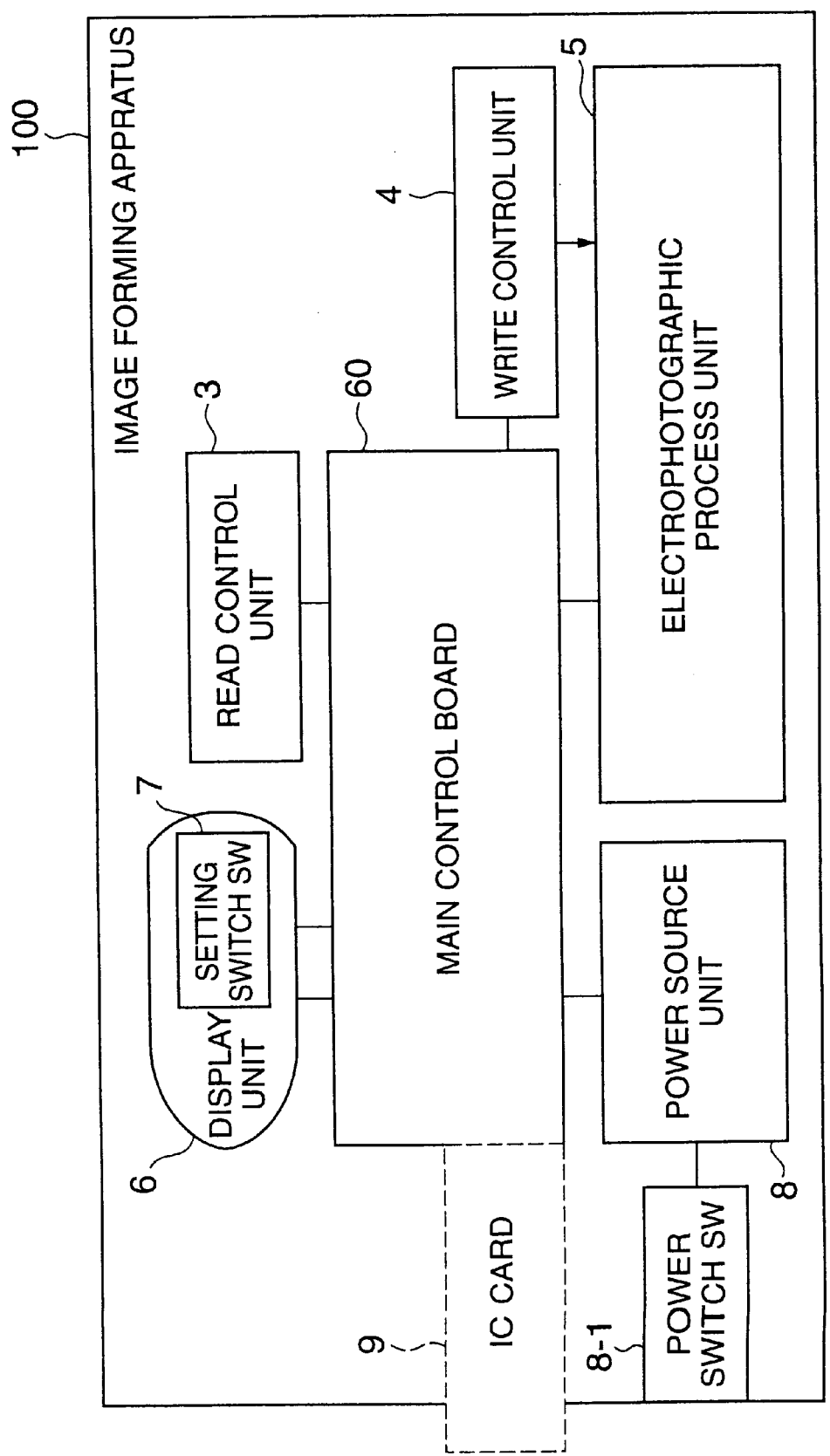
FIG. 17 is a block diagram of the structure of an image forming apparatus of a fifth embodiment of the present invention.

FIG. 17 is a block diagram of the structure of an image forming apparatus of a fifth embodiment of the present invention. In this figure, the same components as in FIG. 1 are indicated by the same reference numerals.

An image forming apparatus 100 shown in FIG. 17 is a digital copying machine which can perform image processing in various modes including a scanning mode, printing mode, facsimile mode, and copying mode. In the copying mode, an image signal read by the read control unit 3 is sent to the write control unit 4 via a main control board 60. In accordance with the image signal sent to the write control unit 4, an electrostatic latent image is formed on the photosensitive member of the electrophotographic process unit 5, and a series of electrophotographic processes are performed to complete the image formation.

Figure 18:
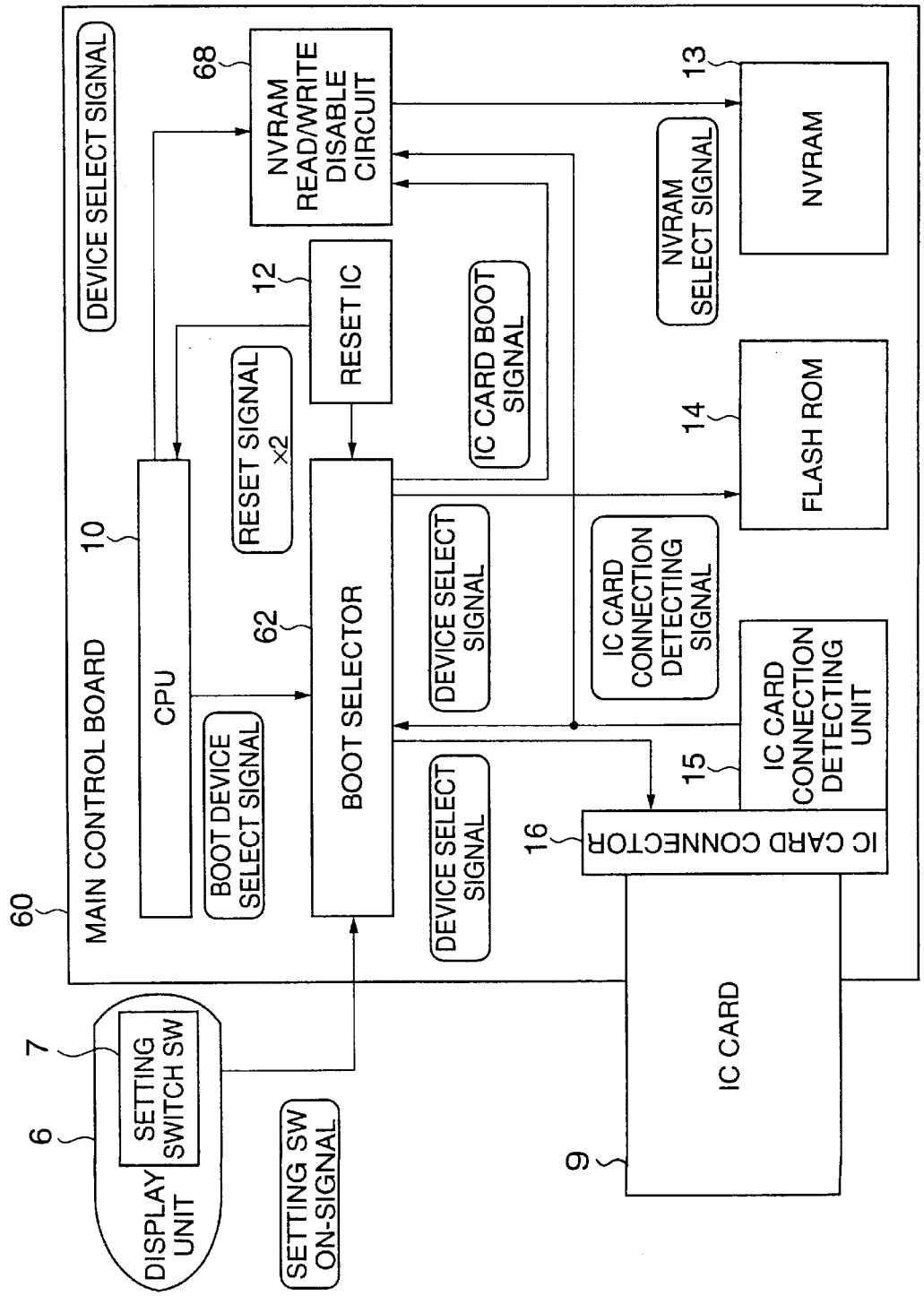
FIG. 18 is a block diagram of the structure of a main control board shown in FIG. 17.

FIG. 18 shows the structure of the main control board 60. In this figure, the same components as in FIG. 2 are indicated by the same reference numerals. The NVRAM 13 shown in FIG. 18 is a non-volatile memory. The power switch 8-1 shown in FIG. 17 is turned on, so that the entire image forming apparatus 100 including the main control board 60 can be supplied with power. After a predetermined voltage is applied to each component of the image forming apparatus 100, the reset IC generates a reset signal to switch the reset signal line from the low level (GND) "L" to the high level (5V) "H". The circuit supplied with the reset signal is reset (initialized) at the point where the rising from "L" to "H" occurs.

Upon resetting (rising from "L" to "H"), the CPU 10 outputs a boot device select signal to a boot selector 62 to read out a boot program. The boot selector 62 makes the boot device signal designate the IC card 9 or the flash ROM 14, with the setting switch 7 being on and the IC card being in a connected state. The boot program is then read out from the flash memory 14 or the IC card 9, and the CPU 10 carries out a series of control programs.

Figure 19:
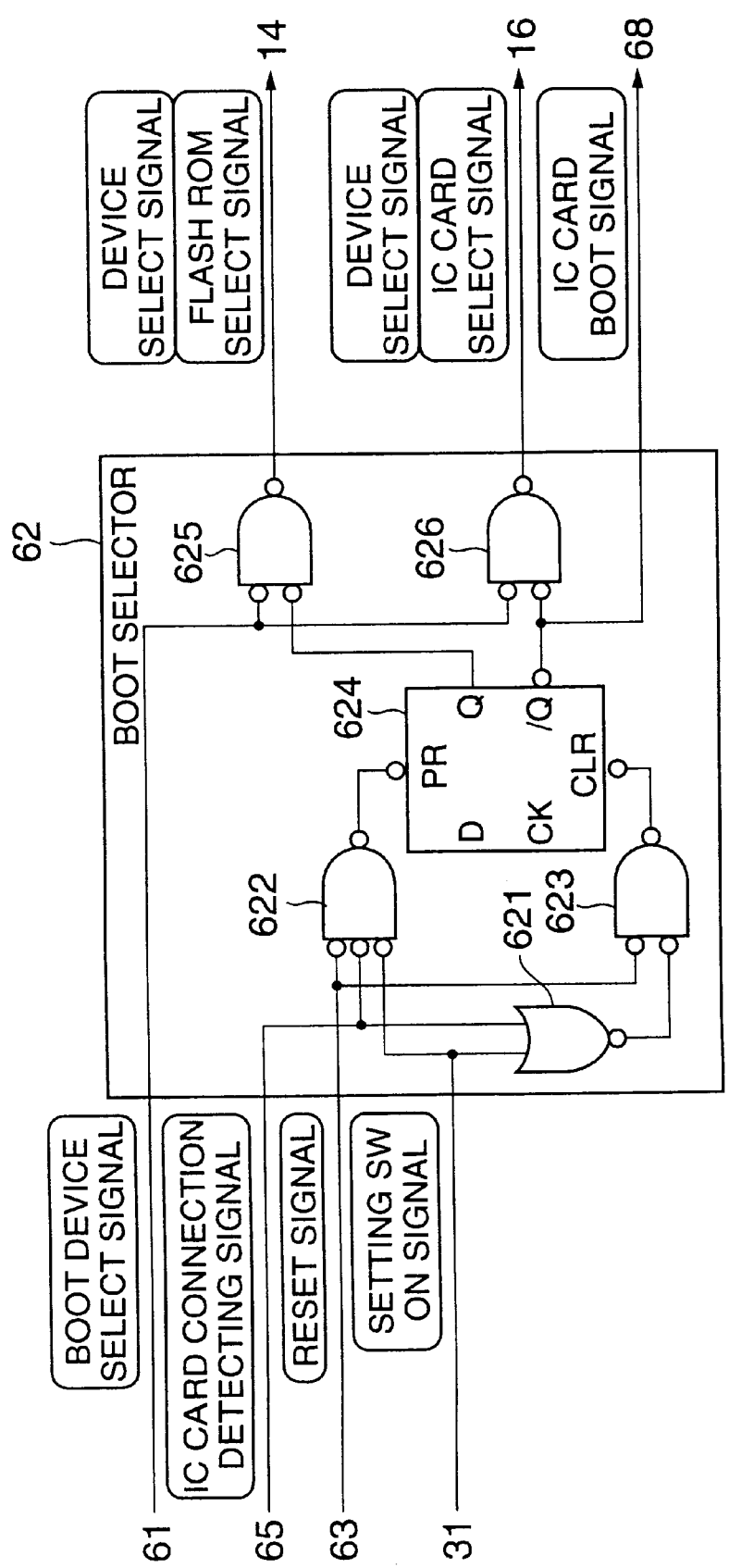
FIG. 19 is a circuit diagram of a boot selector shown in FIG. 18.

FIG. 19 is a circuit diagram of the boot selector 62, and FIGS. 20A to 20D are timing charts of input/output signals for the boot selector 62. The boot selector 62 is supplied with a reset signal (an output signal of the reset IC 12), a setting switch ON-signal (an output signal of the setting switch 7), an IC card connection detecting signal (an output signal of the boot selector 62), and a boot device select signal (a signal generated from the CPU 10) indicating the timing of boot start.

When the reset signal is generated, i.e., when the potential of the reset signal line rises from "L" to "H", with the setting switch 7 being open (no boot designation, the setting switch ON-signal "H") or the IC card 9 being unconnected (the IC card connection detecting signal "H"), a D-flip-flop 624 is reset (cleared) via a NOR gate 621 and a NAND gate 623. Accordingly, the /Q-output (IC card boot signal) of the D-flip-flop 624 becomes inactive (no designation) and rises to the high level "H". In short, when the apparatus power source is turned on, with the setting switch 7 being open or the IC card 9 being unconnected, the IC card 9 is not designated as a boot device.

When the apparatus power source is turned on, with the setting switch 7 being closed and the IC card 9 being connected, the output of a NAND gate 622 rises from "L" to "He at the point where the reset signal rises from "L" to "H". Because of this, the D-flip-flop 624 is set so that the Q-output of the D-flip-flop 624 becomes "H" and the /Q-output, i.e., the IC card boot signal, becomes active (designated) and falls to the low level "L".

In a case where the flip-flop 624 is set while the boot device select signal from the CPU 10 is at the low level "L" indicating the timing of boot designation, i.e., in a case where a boot from the IC card is designated, an IC card select signal, which is the output signal of a NAND gate 626, becomes active and falls to the low level "L". Accordingly, the boot selector 62 designates the IC card 9. The IC card 9 is connected to the IC card connector 16, and the setting switch 7 is closed. When the power source is turned on in this condition (the reset signal rises from "L" to "H" after constant-voltage application to each component), the boot is designated by a program stored in the IC card 9.

In a case where the flip-flop 624 is reset (cleared) while the boot device select signal from the CPU 10 is at the low level "L" indicating the timing of boot designation, i.e., in the case where a boot from the IC card 9 is not designated, a flash ROM select signal, which is the output signal of a NAND gate 625, becomes active and falls to the low level "L". Accordingly, the boot selector 62 designates the flash ROM 14 as a boot device. Here, the IC card 9 is not connected to the IC card connector 16, or the setting switch 7 is open. When the power source is turned on in such a condition (the reset signal rises from "L" to "H" after constant-voltage application to each component), the boot is designated by a program stored in the flash ROM 14.

Figure 20A:
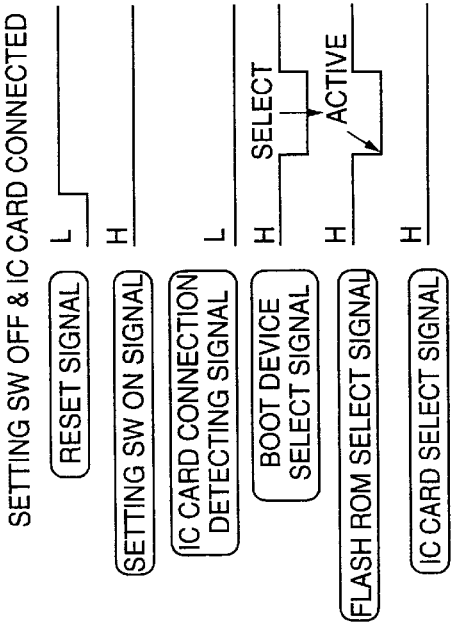
FIGS. 20A to 20D are timing charts showing fluctuations of input/output signals for the boot selector shown in FIG. 19.
Figure 20B:
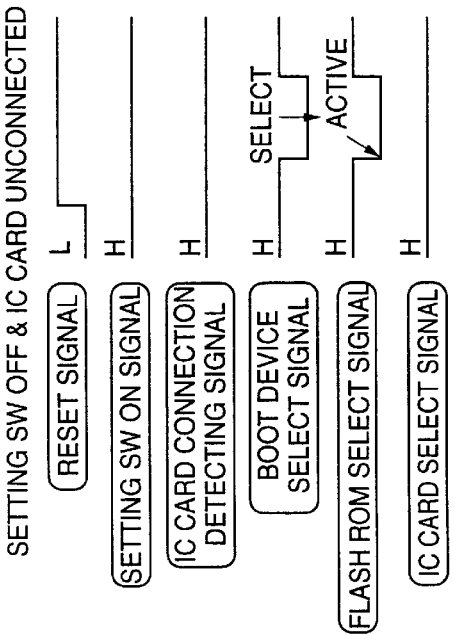
Figure 20C:
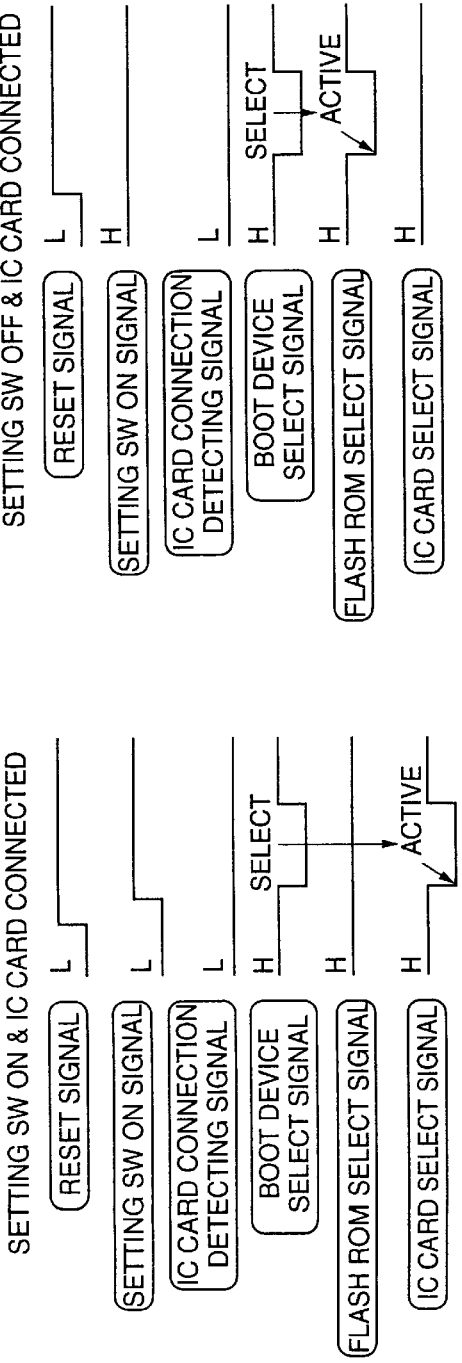
Figure 20D:
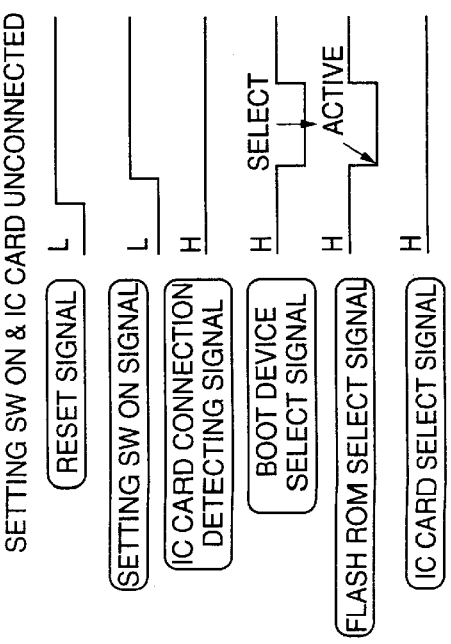

The relationships between the input signals and output signals of the boot selector 62 are shown in FIGS. 20A to 20D. FIG. 20A shows fluctuations of signals in a case where the setting switch 7 is on and the IC card 9 is connected. FIG. 20B shows fluctuations of signals in a case where the setting switch 7 is off and the IC card 9 is connected. FIG. 20C shows fluctuations of signals in a case where the setting switch 7 is on and the IC card 9 is unconnected. FIG. 20D shows fluctuations of signals in a case where the setting switch 7 is off and the IC card 9 is unconnected.

Figure 21:
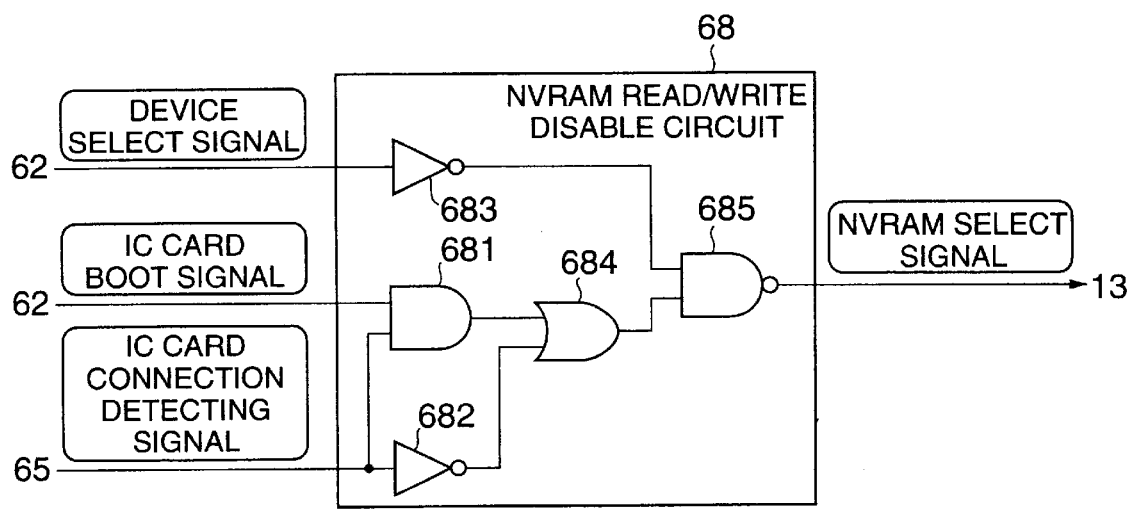
FIG. 21 is a circuit diagram of a read/write disable circuit shown in FIG. 18.
Figure 22A:
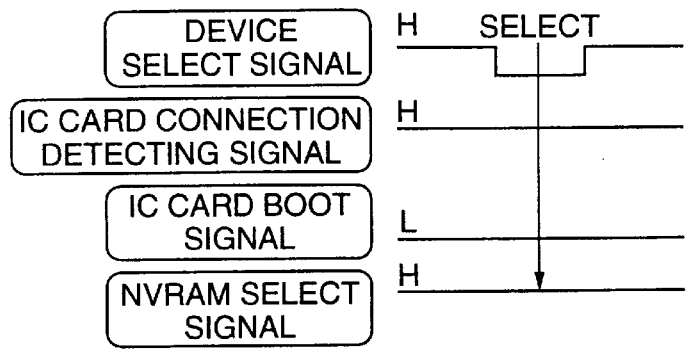
FIGS. 22A to 22C are timing charts showing fluctuations of input/output signals for the read/write disable circuit shown in FIG. 21.
Figure 22B:
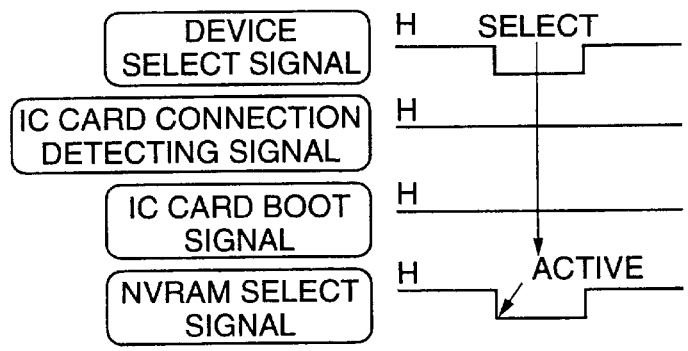
Figure 22C:
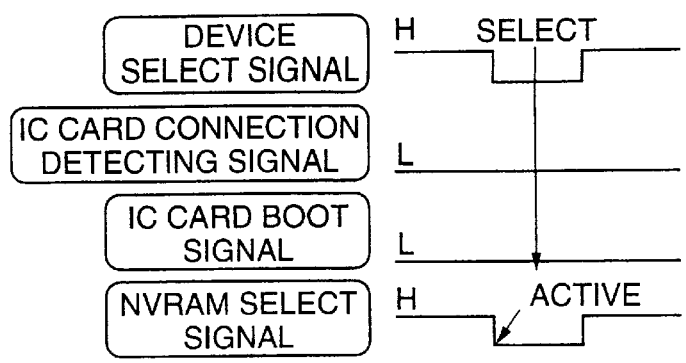

The boot device select signal supplied from the CPU 10, the IC card boot signal, and the IC card connection detecting signal are sent to a NVRAM read/write disable circuit 68. FIG. 21 is a circuit diagram of the read/write disable circuit 68, and FIGS. 22A to 22C are timing charts of input/output signals of the read/write disable circuit 68. In the read/write disable circuit 68, when the IC card boot signal is "L" (the boot from the IC card 9 is designated) and the IC card connection detecting signal is "L" (the IC card is connected), the output of an AND gate 681 is "L", and the output of an inverter 682 is "H". Accordingly, "H" is sent to an input terminal of a NAND gate 685 via an OR gate 684. While the device select signal is "L" indicating the boot designation timing, the output of an inverter 683 becomes "H" and is sent to the other input terminal of the NAND gate 685. Thus, the output of the NAND gate 685 becomes active (enabling read and write access to the NVRAM) and falls to "L", as shown in FIG. 22C.

In a case where the IC card boot signal is "H" and the IC card 9 is unconnected (i.e., the IC card connection detecting signal is "H"), the boot from the IC card 9 is not designated. Here, the output of the AND gate 681 is "H" and is sent to an input terminal of the NAND gate 685 via the OR gate 684. Accordingly, while the device select signal is "L" indicating the boot designation timing, the output of the inverter 683 becomes "H" and is sent to the other input terminal of the NAND gate 685. Thus, the output of the NAND gate 685 becomes active (enabling read and write access to the NVRAM) and falls to "L", as shown in FIG. 22B.

In a case where the IC boot signal is "L3" (the boot from the IC card 9 is designated) and the IC card 9 Is unconnected (i.e., the IC card connection detecting signal is "H"), the boot form the IC card 9 is designated by connecting the IC card 9, but the IC card 9 is disconnected later. In such a case, the output of the AND gate 681 becomes "L", the output of the inverter 682 becomes "L", and the output of the OR gate 684 is fixed at "L". Accordingly, while the device select signal is "L" indicating the boot designation timing, the output of the inverter 683 becomes "H" and is sent to the other input terminal of the NAND gate 685. Still, the output of the NAND gate 685 is inactive (prohibiting read and write access to the NVRAM) and rises to "H", as shown in FIG. 22A.

When the IC card connection detecting unit 15 detects the disconnection of the IC card 9 (i.e., the IC card connection detecting signal is "H") even though the boot from the IC card 9 is designated by the boot selector 62 (i.e., the IC card boot signal is "L"), as in the case of FIG. 22A, the IC card 9 might have slipped off the apparatus. In such a case, the data stored in the NVRAM13 might have been rewritten due to a malfunction such as a program overrunning. Therefore, even if the CPU 10 outputs the device select signal to allow read and write access to the NVRAM 13, a NVRAM select signal supplied to the NVRAM 13 remains "H" to prohibit read and write access to the NVRAM 13.

When the boot from the IC card 9 is designated (the IC card boot signal is "L") and the IC card 9 remains connected (the IC card connection detecting signal is "L"), the CPU 10 outputs the device select signal to allow read and write access to the NVRAM 13, and the read/write disable circuit 68 synchronously outputs the NVRAM select signal to allow read and write access to the NVRAM to the NVRAM 13, thereby enabling read and write access to the NVRAM 13. If the boot is from the flash ROM 14, the NV select signal to allow read and write access to the NVRAM 13 is outputted in accordance with the input of the device select signal, thereby enabling read and write access to the NVRAM 13.

Figure 23:
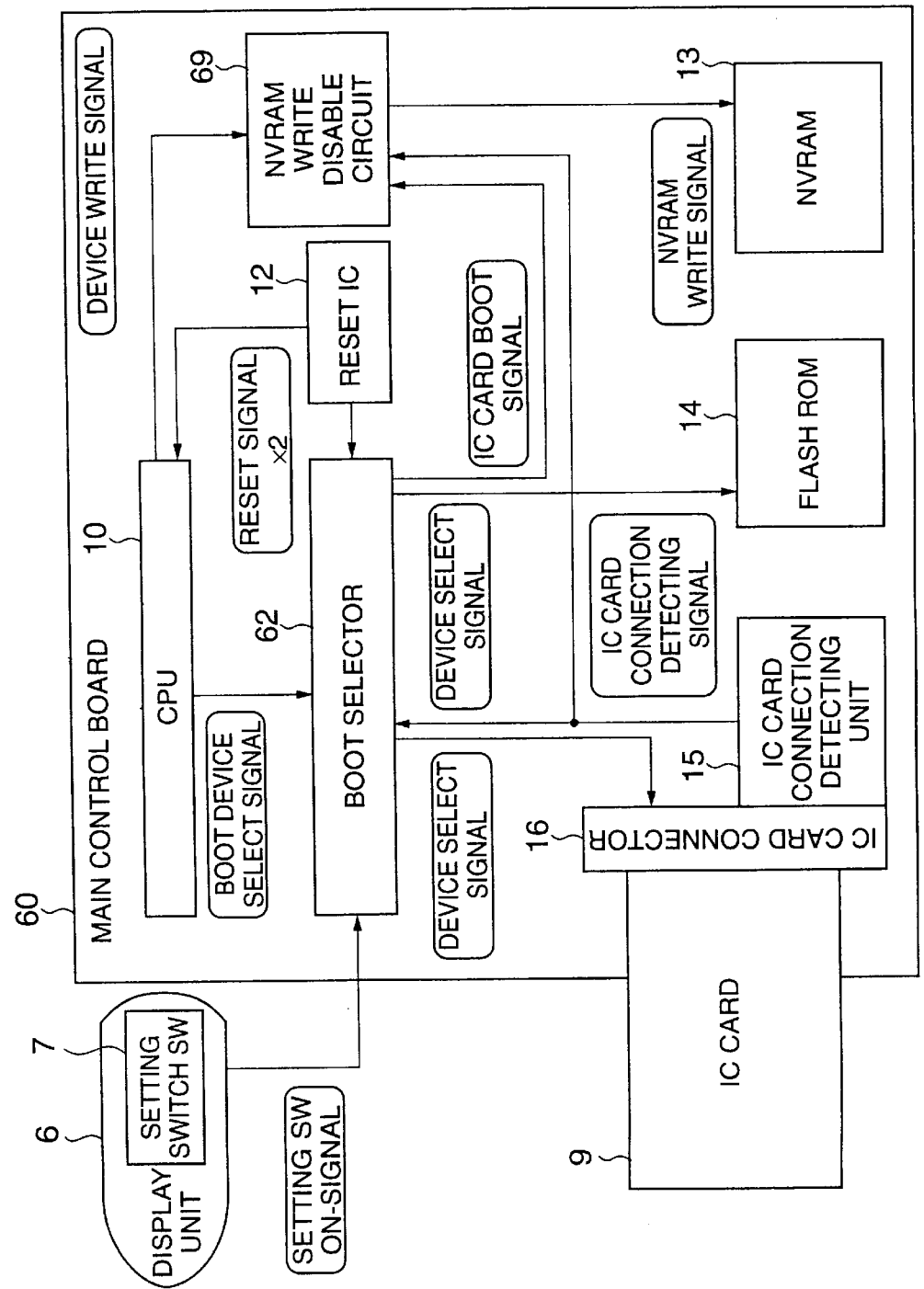
FIG. 23 is a block diagram of the structure of a control board of a sixth embodiment of the present invention.

FIG. 23 is a block diagram of the structure of a main control board in accordance with a sixth embodiment of the present invention. In this figure, the same components as in FIG. 18 are indicated by the same reference numerals.

Figure 24:
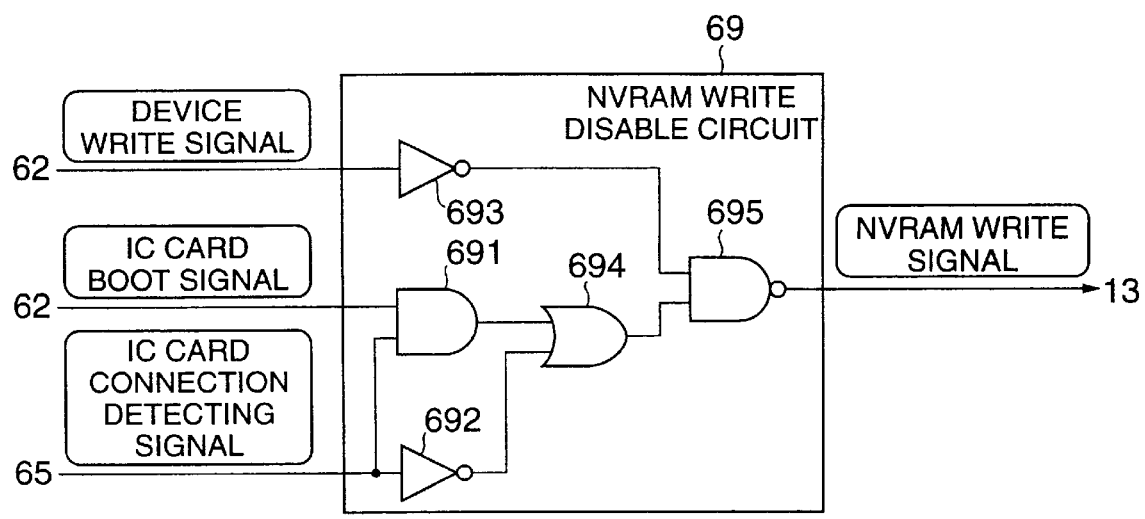
FIG. 24 is a circuit diagram of a write disable circuit shown in FIG. 23.
Figure 25A:
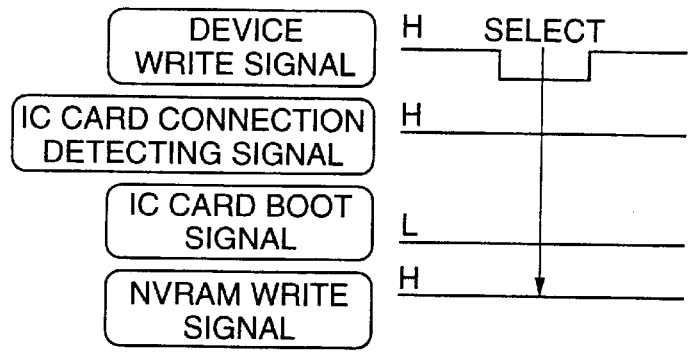
FIGS. 25A to 25C are timing charts showing fluctuations of input/output signals for the write disable circuit shown in FIG. 24.
Figure 25B:
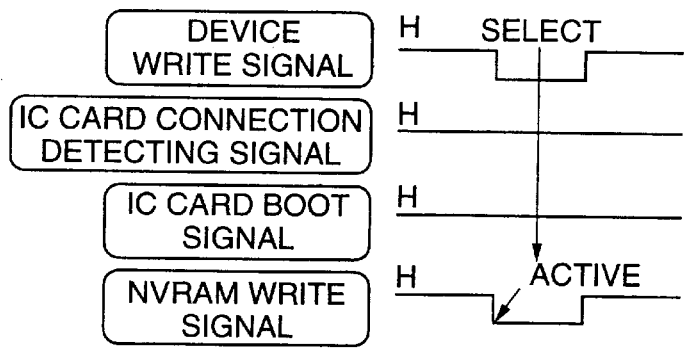
Figure 25C:
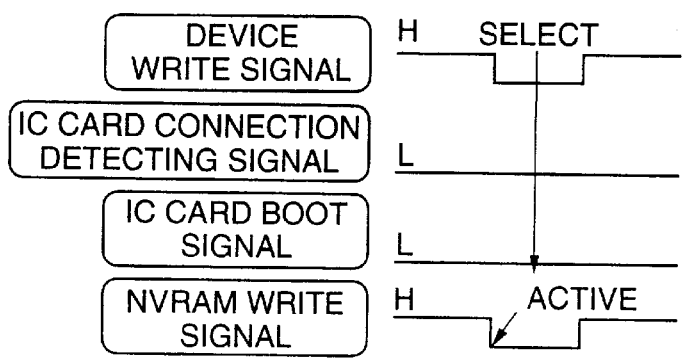

In the sixth embodiment, only write access to the NVRAM 13 during the boot process is selectively prohibited. FIG. 24 is a circuit diagram of a NVRAM write disable circuit 69 of the sixth embodiment, and FIGS. 25A to 25C are timing charts of input/output signals of the NVRAM write disable circuit 69. This write disable circuit 69 is substantially the same as the NVRAM read/write disable circuit 68 if the fifth embodiment. The write disable circuit 69 controls a NVRAM write signal (a write timing signal) outputted from the CPU 10, and maintains the NVRAM write signal at the disable level, when the boot from the IC card 9 is designated and the IC card 9 is unconnected. In other words, when the power source is turned on (the reset signal rises from "L" to "H") while the IC card 9 is connected and the setting switch 7 is closed, the boot selector 62 makes the IC card boot signal active and ELM. If the CPU 10 outputs the device write signal at the write enable level "L" and the IC card 9 is unconnected, the NVRAM write signal remain at the write disable level "H", as shown in FIG. 25A.

The other components of the sixth embodiment are substantially the same as in the fifth embodiment. In the sixth embodiment, when the boot from the IC card 9 is started and the IC card 9 is disconnected, the write disable circuit 69 prohibits write access to the NVRAM 13. In other words, in a case where the IC card connection detecting unit 15 detects the disconnection of the IC card 9 (the IC card connection detecting signal is "H"), though the boot selector 62 designates the boot from the IC card 9 (the IC card boot signal is "L"), the IC card might have slipped off the apparatus. In such a case, there is a possibility that the data stored in the NVRAM 13 might be rewritten due to malfunction such as program overrunning. Therefore, the NVRAM select signal output is maintained at "H" to prohibit write access to the NVRAM 13, though the CPU 10 outputs the device write signal at the write enable level "L". Since the write access to the NVRAM 13 is prohibited, user data stored in the NVRAM 13 can be used at the time of download.

If the boot from the IC card 9 is designated (the IC card boot signal is "L") and the IC card is connected (the IC card connection detecting signal is "L"), the NVRAM write signal is outputted to the NVRAM 13 as the CPU 61 switches the device write signal to the write enable level "L", thereby allowing write access to the NVRAM 13. If the boot from the flash ROM 14 is designated, the device write signal outputted from the CPU 10 is outputted as it is, thereby allowing write access to the NVRAM 13.

In the fifth embodiment and the sixth embodiment, if the power source is turned on with the setting switch being open, the boot selector 62 does not select the boot from the IC card 9, even though the IC card 9 is connected to the IC card connector 16. Accordingly, the functions of the apparatus can be extended or complemented by connecting an IC card storing data unrelated to boot, such as data for option programs, storing data generated by the apparatus, or for inputting image data. Even if the IC card is used for downloading or option programs, user data stored in the NVRAM 13 is protected. Thus, no functional or time loss is caused to the user even when the apparatus is malfunctioned.

The present invention is not limited to the specifically disclosed embodiments, but variations and modifications may be made without departing from the scope of the present invention.

The present invention is based on Japanese priority applications No. 10-268495 filed on Sep. 22, 1998 and No. 10-335387 filed on Nov. 26, 1998, the entire contents of which are hereby incorporated by reference.

What is claimed is:

1. An electronic apparatus comprising:

storage means for storing a first program connecting means for connecting a memory medium which stores a second program;

control means for controlling an operation of the electronic apparatus by carrying out one of the first program and the second program in accordance with memory maps having at least addresses of the storage means and the memory medium logically arranged; and interchanging means for interchanging the addresses of the storage means and the memory medium in accordance with the memory maps so that one of the first program and the second program is selectively read out and is supplied to the control means, wherein the interchanging means includes mode setting means and mode changing means, the mode setting means for setting an allocation of the addresses of the storage means and the memory medium on the memory maps when turning a power of the electronic apparatus on, the mode changing means for changing the allocation of the addresses on the memory maps after the power is turned on, and wherein the second program is downloaded from the memory medium when turning a power of the electronic device on and when the mode setting means sets an address switching mode, and the first program is downloaded from the storage means, after the second program is downloaded, by the control means causing the mode changing means to change the address switching mode to a regular mode so as to interchange the address of the storage means and the address of the memory medium on the memory maps.

2. An electronic apparatus comprising:

storage means for storing a first program;

connecting mens for connecting a memory medium which stores a second program;

detection means for detecting whether the memory medium is connected to the connecting means;

control means for controlling an operation of the electronic apparatus by carrying out one of the first program and the second program in accordance with memory maps having at least addresses of the storage means and the memory medium logically arranged; and interchanging means for interchanging the addresses of the storage means and the memory medium in accordance with the memory maps so that one of the first program and the second program is selectively read out and is supplied to the control means, wherein the interchanging means includes mode setting means and mode changing means, the mode setting means for setting an allocation of the addresses of the storage means and the memory medium on the memory maps when turning a power of the electronic apparatus on, the mode changing means for changing the allocation of the addresses on the memory maps after the power is turned on, and wherein the second program is downloaded from the memory medium when turning a power of the electronic device on and when connection of the memory medium is detected and the mode setting means sets an address switching mode, and the first program is downloaded from the storage means, after the second program is downloaded, by the control means causing the mode changing means to change the address switching mode to a regular mode so as to interchange the address of the storage means and the address of the memory medium on the memory maps.

3. The electronic apparatus as claimed in claim 2, further comprising error message output means for outputting an error message in a case where disconnection of the memory medium is detected.

4. The electronic apparatus as claimed in claim 2, further comprising:

a switch configured to control issuance of an instruction to download the second program;

a non-volatile memory which stores data to be saved while the power source of the electronic apparatus is off; and first access disable means for prohibiting access to the non-volatile memory in a case where disconnection of the memory medium is detected and the power switch is in the predetermined position when the power source of the electronic apparatus is turned on.

5. The electronic apparatus as claimed in claim 4, further comprising second access disable means for prohibiting access to the non-volatile memory in a case where the detection means detects disconnection of the memory medium after the second program is read from the memory medium.

6. The electronic apparatus as claimed in claim 4, further comprising write disable means for prohibiting write in the non-volatile memory in a case where the detection means detects disconnection of the memory medium after the second program is read from the memory medium.

7. An electronic apparatus comprising:

a memory which stores a first program;

a connector for connecting a memory medium which stores a second program;

a processor which controls an operation of the electronic apparatus by caring out one of the first program and the second program in accordance with memory maps having at least addresses of the memory and the memory medium logically arranged; and an interchanging circuit which interchanges the addresses of the memory and the memory medium in accordance with the memory maps so that one of the first program and the second program is selectively read out and is supplied to the processor, wherein the interchanging circuit includes a mode setting circuit and a mode changing circuit the mode setting circuit setting an allocation of the addresses of the memory and the memory medium on the memory maps when aiming a power of the electronic apparatus on, the mode changing circuit changing the allocation of the addresses on the memory maps after the power is turned on, and wherein the second program is downloaded from the memory medium when turning a power of the electronic device on and when the mode setting circuit sets an address switching mode, and the first program is downloaded from the memory, after the second program is downloaded, by the processor causing the mode changing circuit to change the address switching mode to a regular mode so as to interchange the address of the memory and the address of the memory medium on the memory maps.

8. An electronic apparatus comprising:

a memory which stores a first program;

a connector for connecting a memory medium which stores a second program;

a detector which detects whether the memory medium is connected to the connector;

a processor which controls an operation of the electronic apparatus by carrying out one of the first program and the second program in accordance with memory maps having at least addresses of the memory and the memory medium logically arranged; and an interchanging circuit which interchanges the addresses of the memory and the memory medium in accordance with the memory maps so that one of the first program and the second program is selectively read out and is supplied to the processor, wherein the interchanging circuit includes a mode setting circuit and a mode changing circuit, the mode setting circuit for setting an allocation of the addresses of the memory and the memory medium on the memory Umps when turning a power of the electric apparatus on, the mode changing circuit for changing the allocation of the addresses on the memory maps after the power is turned on, and wherein the second program is downloaded from the memory medium when turning a power of the electronic device on and when connection of the memory medium is detected and the mode setting circuit sets an address switching mode, and the first program is downloaded from the storage means, after the second program is downloaded, by the processor causing the mode changing circuit to change the address switching mode to a regular mode so as to interchange the address of the memory and the address of the memory medium on the memory maps.

9. The electronic apparatus as claimed in claim 8, further comprising an error message output circuit which outputs an error message in a case where disconnection of the memory medium is detected.

10. The electronic apparatus as claimed in claim 8, further comprising:
   a switch configured to control issuance of an instruction to download the second program;
   a non-volatile memory which stores data to be saved while the power source of the electronic apparatus is off; and
   a first access disable circuit which prohibits access to the non-volatile memory in a case where disconnection of the memory medium is detected and the switch is in the predetermined position when the power source of the electronic apparatus is turned on.

11. The electronic apparatus as claimed in claim 10, further comprising a second access disable circuit which prohibits access to the non-volatile memory in a case where the detector detects disconnection of the memory medium after the second program is read from the memory medium.

12. The electronic apparatus as claimed in claim 10, further comprising a write disable circuit which prohibits write in the non-volatile memory in a case where the detector detects disconnection of the memory medium after the second program is read from the memory medium.

* * * * *